(12) United States Patent
Nagel et al.

(10) Patent No.: US 11,505,459 B1
(45) Date of Patent: Nov. 22, 2022

(54) PROCESSES FOR PRODUCING HYDROGEN

(71) Applicant: Alpha Portfolio LLC, Naples, FL (US)

(72) Inventors: Christopher J. Nagel, Wayland, MA (US); Stephen P. Lemoi, Johnston, RI (US); Mark G. Janson, Swansea, MA (US)

(73) Assignee: Alpha Portfolio LLC, Naples, FL (US)

( * ) Notice: Subject to any disclaimer, the term of this patent is extended or adjusted under 35 U.S.C. 154(b) by 0 days.

(21) Appl. No.: 17/474,444

(22) Filed: Sep. 14, 2021

(51) Int. Cl.
  *C01B 3/00* (2006.01)
  *C01B 3/26* (2006.01)
  *B01J 19/08* (2006.01)

(52) U.S. Cl.
  CPC .............. *C01B 3/26* (2013.01); *B01J 19/087* (2013.01); *B01J 2219/0803* (2013.01); *B01J 2219/0869* (2013.01)

(58) Field of Classification Search
  CPC .......... C01B 3/26; C01B 3/042; B01J 19/087; B01J 2219/0803; B01J 2219/0869; B01J 19/12; B01J 2219/0849; B01J 2219/0854; B01J 2219/0877; B01J 2219/12; Y02E 60/364; Y02E 60/36
  See application file for complete search history.

(56) References Cited

U.S. PATENT DOCUMENTS 5,149,407 A * 9/1992 Meyer ..................... C01B 3/042
                                                                204/157.52
10,844,483 B1 * 11/2020 Nagel ................... C23C 16/483

* cited by examiner

*Primary Examiner* — Xiuyu Tai
(74) *Attorney, Agent, or Firm* — Elmore Patent Law Group, P.C.; Carolyn S. Elmore; Joseph C. Zucchero

(57) ABSTRACT

The invention includes apparatus and methods for instantiating hydrogen in a nanoporous carbon powder.

21 Claims, 21 Drawing Sheets

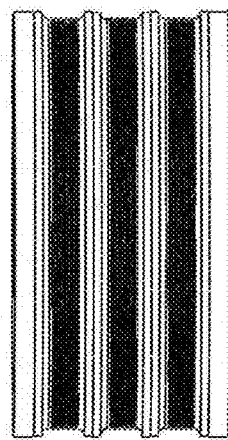
3 Coil 1"
QPP Ag/Cu-
Cu-Ag/Cu
FIG. 3C
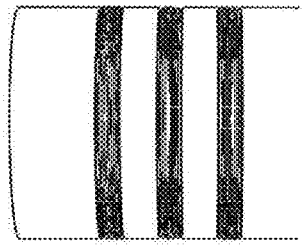
3 Coil 2" QPP
Ag/Cu-Cu-Ag/
Cu
FIG. 3E
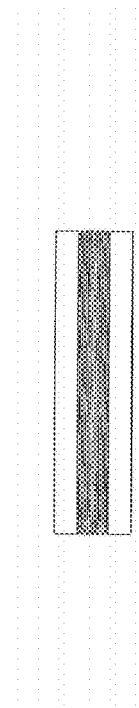
1" QPP Coil
Ag/Cu
( Also
Pt,Ni240 )
FIG. 3B
2" QPP Coil Cu
( Also Pt,Ni240, Al
and Ag/Cu )
FIG. 3D
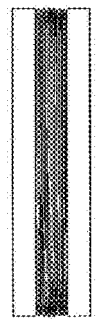
1" QPP Coil
-Copper
FIG. 3A

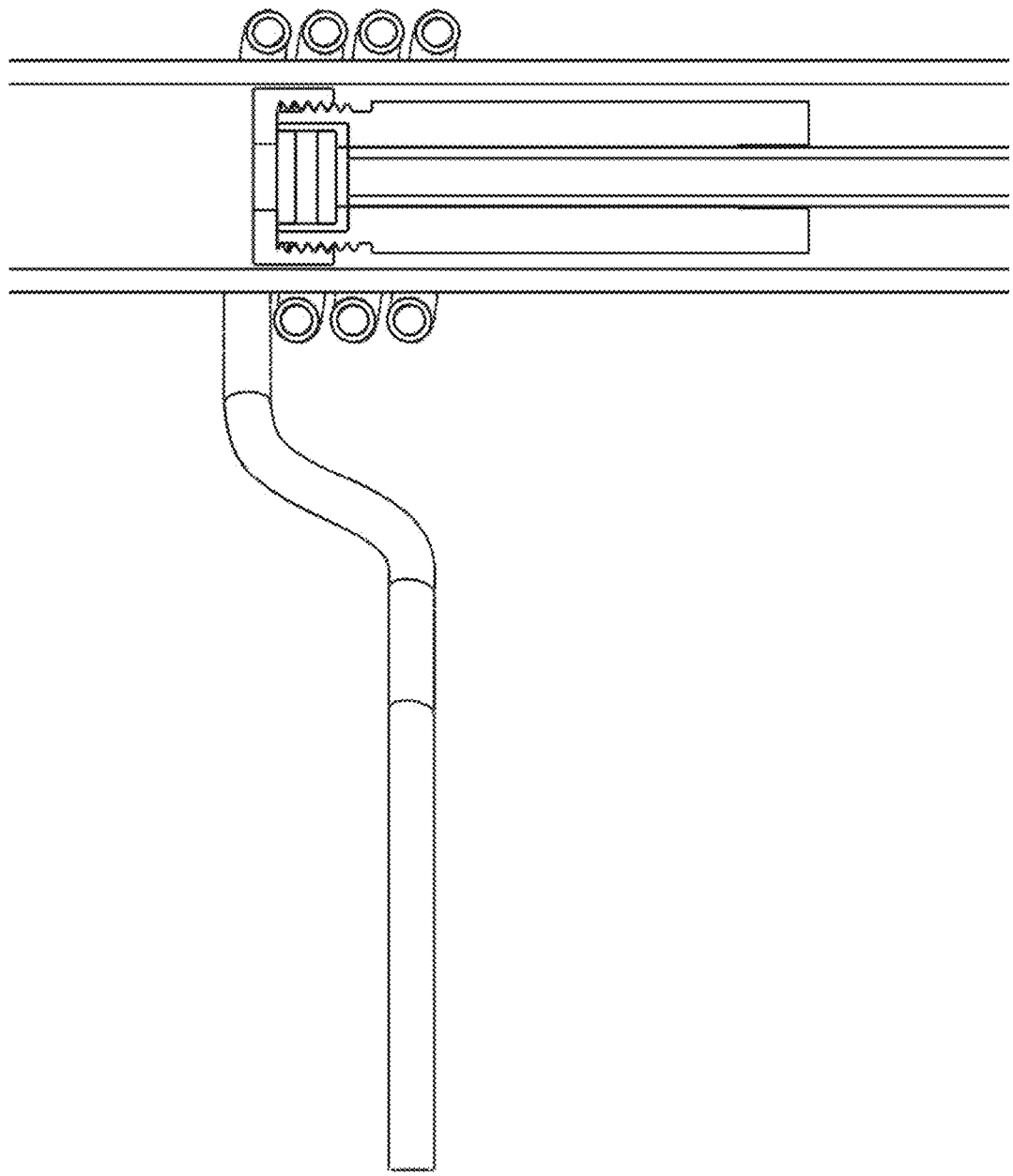

PROCESSES FOR PRODUCING HYDROGEN

BACKGROUND OF THE INVENTION

Processes for producing hydrogen, including hydrogen on demand systems, are described. For example, electrolyzers including a proton-exchange membrane, a cathode disposed on one surface, and an anode on a second surface of the membrane have been used. Such an anode can include an ionomer binder with dispersed particles having a core and catalytic layer, such as iridium or platinum. However, such systems can be characterized by high pressures and/or water-saturated gas. Therefore, there is a benefit to improving such processes to produce dry or substantially dry hydrogen gas.

SUMMARY OF THE INVENTION

The present invention relates to the discovery that apparatuses containing carbon matrices can be used to produce hydrogen. The processes of the invention include the application of electromagnetic radiation, directly and/or indirectly, to gases, nano-porous carbon, or compositions and combinations thereof, thereby pre-treating the gas, and exposing a carbon matrix to pre-treated gas in an apparatus of the invention and recovering hydrogen produced therein.

The invention relates to apparatuses for instantiating materials and processes for using such apparatuses.

The invention includes processes comprising the steps of contacting a bed comprising nanoporous carbon with an activated gas while applying electromagnetic radiation to the nanoporous carbon for a time sufficient to cause instantiation of hydrogen and collecting the hydrogen. The invention further relates to the hydrogen produced by the process.

More specifically, the invention includes a process of instantiating hydrogen within a nanoporous carbon powder comprising the steps of:

(i) adding a nanoporous carbon powder into a reactor assembly (RA), as described below, (ii) adding a first gas composition to the reactor assembly;

(iii) powering one or more RA coils to a first electromagnetic energy level;

(iv) subjecting the nanoporous carbon powder (the terms nanoporous carbon powder, nanoporous carbon material and nanoporous carbon are used herein interchangeably) to harmonic patterning to instantiate hydrogen thereby producing a product gas composition;

(v) collecting the product gas composition and optionally separating hydrogen.

In one embodiment, the RA coil surrounds a nanoporous carbon bed to establish a harmonic electromagnetic resonance in ultramicropores of the nanoporous carbon powder. The first gas composition can be, for example, air, oxygen, hydrogen, helium, nitrogen, neon, argon, krypton, xenon, carbon monoxide, carbon dioxide or mixtures thereof, preferably nitrogen or air. Preferably, the nanoporous carbon powder comprises graphene having at least 99.9% wt. carbon (metals basis), a mass mean diameter between 1 µm and 5 mm, and an ultramicropore surface area between about 100 and 3000 $m^2/g$.

More specifically, the invention includes a reactor assembly comprising:

(a) A reactor chamber containing a nanoporous carbon material;

(b) A second porous frit defining the ceiling of the reactor chamber; wherein each porous frit has a porosity that is sufficient to allow a gas to permeate into the reactor chamber and contain a nanoporous carbon material;

(c) A reactor head space disposed above the reactor cap;

(d) 1, 2, 3, 4, 5 or more RA coils surrounding the reactor chamber and/or reactor head space operably connected to one or more RA frequency generators and/or one or more power supplies;

(e) 0, 1, 2, 3, 4, 5 or more pairs of RA lamps wherein the pairs of RA lamps are disposed circumferentially around the RA coils and define a space between the pairs of RA lamps and the RA coils, when present;

(f) An optional x-ray source configured to expose the reactor chamber to x-rays;

(g) One or more optional lasers configured to direct a laser towards (e.g., through or across) the reactor chamber or the gas within the reactor assembly, when present; and (h) A computer processing unit (CPU) configured to control the power supply, frequency generator, x-ray source, lamps and/or lasers.

As will be described in more detail below, the gas inlet of the reactor assembly can be in fluid connection with at least one gas supply selected from the group consisting of air, oxygen, hydrogen, helium, nitrogen, neon, argon, krypton, xenon, carbon monoxide, carbon dioxide and mixtures thereof; and/or (iii) the gas supply is directed through a gas manifold controlled by mass flow meters.

As will be described in more detail below, the nanoporous carbon powder charged to the reactor assembly can comprise graphene having at least 95% wt. carbon (metals basis), a mass mean diameter between 1 µm and 5 mm, and an ultramicropore surface area between about 100 and 3000 $m^2/g$. The nanoporous carbon powder is preferably characterized by acid conditioning, wherein the acid is selected from the group consisting of HCl, HF, HBr, HI, sulfuric acid, phosphoric acid, carbonic acid, and nitric acid, and a residual water content of less than that achieved upon exposure to a relative humidity (RH) of less than 40% RH at room temperature. In a preferred embodiment, the process contemplates degassing the nanoporous carbon powder prior to the process.

As will be described in more detail below, the reactor assembly can include a plurality of devices that can impart electromagnetic fields, including x-ray sources, coils, lasers and lamps or lights, including pencil lamps, short wave and long wave lamps. The wavelengths generated by each device (e.g., lamps or lasers) can be independently selected.

As will be described in more detail below, the RA coils can be made from the same or different electrically conducting materials. For example, a first RA coil comprises a copper wire winding, a second RA coil comprises a braiding of copper wire and silver wire, and a third RA coil is a platinum wire winding and each RA coil is configured to create a magnetic field and wherein each power supply independently provides AC and/or DC current.

As will be described in more detail below, the reactor assembly can be characterized by (i) a first pair of RA lamps configured in a first plane defined by a center axis and a first radius of the reactor chamber, (ii) a second pair of RA lamps configured in a second plane defined by the center axis and a second radius of the reactor chamber and (iii) a third pair of RA lamps configured in a third plane defined by the center axis and a third radius of the reactor chamber. Preferably, each RA lamp is a pencil lamp characterized by a tip substantially equidistant from the central axis and each pair of RA lamps comprises a vertical RA lamp and a horizontal RA lamp. Preferably each pair of lamps is equidistantly spaced around the circumference of the reactor chamber.

As will be described in more detail below, the reactor assembly further comprises an electromagnetic embedding enclosure (E/MEE or EMEE), as defined more specifically below. The E/MEE is typically located along a gas line upstream of the reactor assembly gas inlet. Typically, an electromagnetic embedding enclosure located upstream of the gas inlet comprises:

(a) a gas inlet;
(b) at least one E/MEE pencil lamp positioned below the internal gas line, at least one E/MEE pencil lamp positioned above the internal gas line and at least one E/MEE pencil lamp positioned to the side of the internal gas line;

wherein each E/MEE pencil lamp is independently rotatably mounted, located along the length of the internal gas line, and the lamps and/or coil(s) are powered by a power supply, preferably the power supply of the reactor assembly;

the gas flow, lamps and/or coil(s) are preferably independently controlled by one or more central processing units, preferably the central processing unit (CPU) of the reactor assembly. Typically, a CPU independently controls powering each E/MEE pencil lamp and a rotation position of each E/MEE pencil lamp.

As will be described in more detail below, the E/MEE housing can be typically closed and opaque, the internal gas line can be transparent and external gas line in fluid connection with the housing outlet and gas inlet can be opaque. Typically, the internal gas line is between 50 cm and 5 meters or more and has a diameter between 2 mm and 25 cm or more.

As will be described in more detail below, the apparatus can have at least 5 E/MEE pencil lamps located along the internal gas line. Each E/MEE pencil lamp can be independently placed such that its longitudinal axis is (i) parallel to the internal gas line, (ii) disposed radially in a vertical plane to the internal gas line, or (iii) perpendicular to the plane created along the longitudinal axis of the internal gas line or along the vertical axis of the internal gas line. Each E/MEE pencil lamp can be independently affixed to one or more pivots that permit rotation between about 0 and 360 degrees with respect to the x, y, and/or z axis wherein (i) the x-axis is defined as the axis parallel to the gas line and its vertical plane, (ii) the y-axis defining the axis perpendicular to the gas line and parallel to its horizontal plane, and (iii) the z-axis is defined as the axis perpendicular to the gas line and parallel to its vertical plane.

As will be described in more detail below, at least one E/MEE pencil lamp can be a neon lamp, at least one E/MEE pencil lamp can be a krypton lamp, and at least one E/MEE pencil lamp can be an argon lamp. It can be desirable to match, or pair, one or more E/MEE pencil lamps with one or more (e.g., a pair) of RA lamps. Accordingly, at least one pair of RA pencil lamps can be selected from the group consisting of a neon lamp, a krypton lamp and an argon lamp.

As will be described in more detail below, the invention also includes nanoporous carbon powder compositions and gas compositions produced in accordance with the claimed methods and processes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A, FIG. 3B, FIG. 3C, FIG. 3D and FIG. 3E provides five views of coils which can be used in a reactor assembly.

FIGS. 6A and 6B are illustrations of two examples of two composite reactor assemblies. FIG. 6A illustrates a Composite Reactor with a copper body, carbon graphite cup and a carbon graphite cap. FIG. 6B illustrates a Composite Reactor with a carbon graphite body and cap and metal foil boundary.

DETAILED DESCRIPTION

Figure 1:
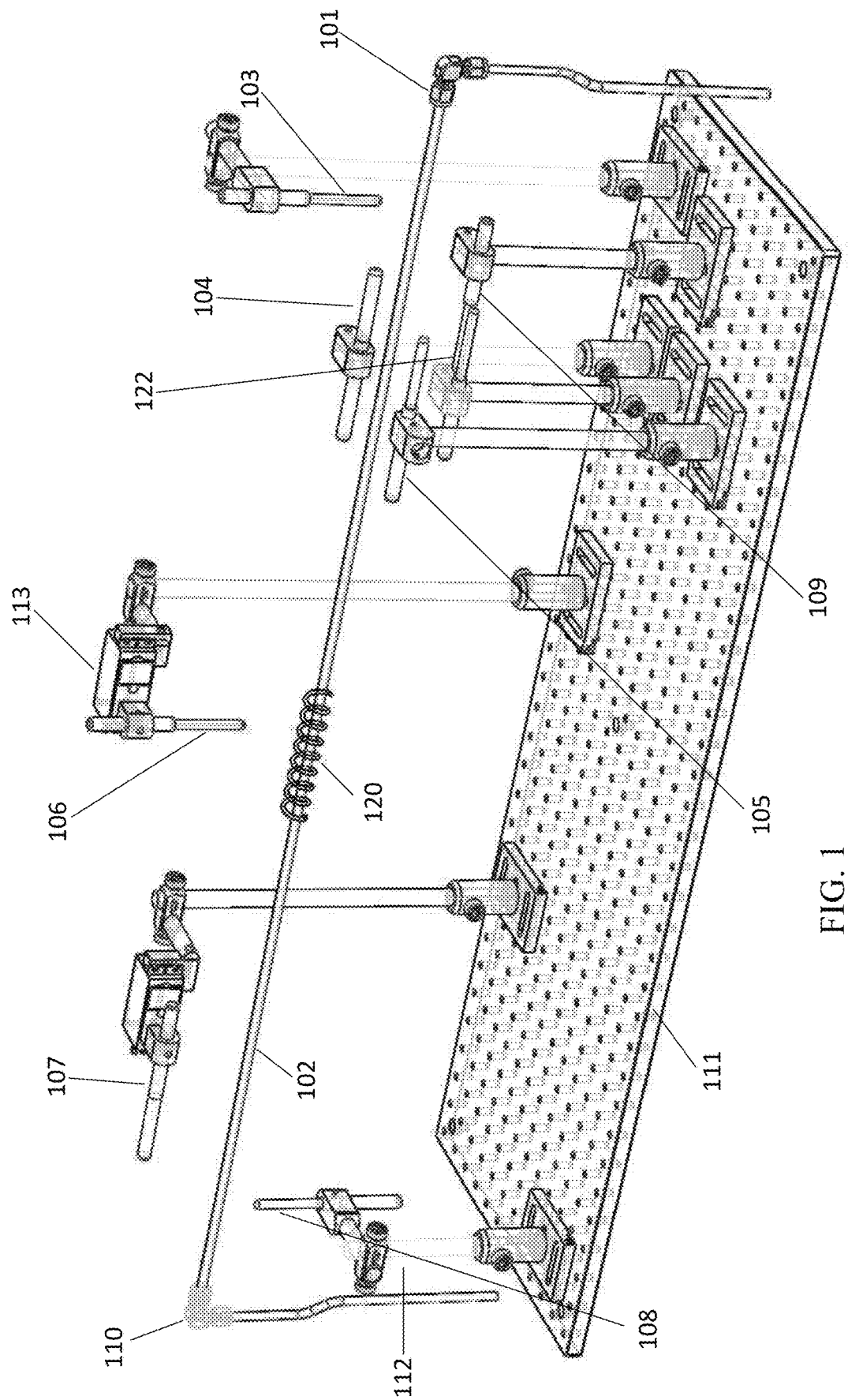
FIG. 1 is a perspective view of an E/MEE of the invention.

The invention relates to methods of instantiating hydrogen in nanoporous carbon powders. The invention includes methods comprising the steps of contacting a bed comprising a nanoporous carbon powder with a first gas composition, and optionally an electromagnetically activated gas, while applying electromagnetic radiation to the nanoporous carbon powder for a time sufficient to cause instantiation within and/or from carbon nanopores. The process results in a product gas composition comprising hydrogen substantially distinct from the first gas composition. The processes of the invention have broad applicability in producing hydrogen, such as hydrogen on demand.

Nanoporous Carbon Powders

Nanoporous carbon powders or nanostructured porous carbons can be used in the processes and methods of the invention. Nanoporous carbon powders or nanostructured porous carbons are also referred to herein as "starting material" or "charge material". The carbon powder preferably provides a surface and porosity (e.g., ultra-microporosity) that enhances metal deposition, including deposit, instantiation and growth. Preferred carbon powders include activated carbon, engineered carbon, graphite, and graphene. For example, carbon materials that can be used herein include graphene foams, fibers, nanorods, nanotubes, fullerenes, flakes, carbon black, acetylene black, mesophase carbon particles, microbeads and, grains. The term "powder" is intended to define discrete fine, particles or grains. The powder can be dry and flowable or it can be humidified and caked, such as a cake that can be broken apart with agitation. Although powders are preferred, the invention contemplates substituting larger carbon materials, such as bricks and rods including larger porous carbon blocks and materials, for powders in the processes of the invention.

The examples used herein typically describe highly purified forms of carbon, such as >99.995% wt. pure carbon (metals basis). Highly purified forms of carbon are exemplified for proof of principal, quality control and to ensure that the results described herein are not the result of cross-contamination or diffusion within the carbon source. However, it is contemplated that carbon materials of less purity can also be used. Thus, the carbon powder can comprise at least about 95% wt. carbon, such as at least about 96%, 97%, 98% or 99% wt. carbon. In a preferred embodiment, the carbon powder can be at least 99.9%, 99.99% or 99.999% wt. carbon. In each instance, purity can be determined on either an ash basis or on a metal basis. In another preferred embodiment, the carbon powder is a blend of different carbon types and forms. In one embodiment, the carbon bed is comprised of a blend of different nano-engineered porous carbon forms. Carbon powders can comprise dopants.

The carbon powder preferably comprises microparticles. The volume median geometric particle size of preferred carbon powders can be between less than about 1 μm and 5 mm or more. Preferred carbon powders can be between about 1 μm and 500 μm, such as between about 5 μm and 200 μm. Preferred carbon powders used in the exemplification had median diameters between about 7 μm and 13 μm and about 30 μm and 150 μm.

The dispersity of the carbon particle size can improve the quality of the products. It is convenient to use a carbon material that is homogeneous in size or monodisperse. Thus, a preferred carbon is characterized by a polydispersity index of between about 0.5 and 1.5, such as between about 0.6 and 1.4, about 0.7 and 1.3, about 0.8 and 1.2, or between about 0.9 and 1.1. The polydispersity index (or PDI) is the ratio of the mass mean diameter and number average diameter of a particle population. Carbon materials characterized by a bimodal particle size can offer improved gas flow in the reactor.

The carbon powder is preferably porous. The pores, or cavities, residing within the carbon particles can be macropores, micropores, nanopores and/or ultra-micropores. A pore can include defects in electron distribution, compared to graphene, often caused by changes in morphology due to holes, fissures or crevices, corners, edges, swelling, or changes in surface chemistry, such as the addition of chemical moieties or surface groups, etc. For example, variation in the spaces that may arise between layers of carbon sheets, fullerenes or nanotubes are contemplated. It is believed that instantiation preferentially occurs at or within a pore or defect-containing pore and the nature of the surface characteristics can impact instantiation. For example, Micromeritics enhanced pore distribution analysis (e.g., ISO 15901-3) can be used to characterize the carbon. It is preferred that the carbon powder is nanoporous. A "nanoporous carbon powder" is defined herein as a carbon powder characterized by nanopores having a pore dimension (e.g., width or diameter) of less than 100 nm. For example, IUPAC subdivides nanoporous materials as microporous (having pore diameters between 0.2 and 2 nm), mesoporous materials (having pore diameters between 2 and 50 nm) and macroporous materials (having pore diameters greater than 50 nm). Ultra-micropores are defined herein as having pore diameters of less than about 1 nm.

Uniformity in pore size and/or geometry is also desirable. For example, ultramicropores in preferred carbon materials (e.g., powders) account for at least about 10% of the total porosity, such as at least about 20%, at least about 30%, at least about 40%, at least about 50%, at least about 60%, at least about 70%, at least about 80%, or at least about 90%.

Preferred carbon materials (e.g., powders) are characterized with a significant number, prevalence or concentration of ultra-micropores having the same diameter, thereby providing predictable electromagnetic harmonic resonances and/or standing wave forms within the pores, cavities, and gaps. The word "diameter" in this context is not intended to require a spherical geometry of a pore but is intended to embrace a dimension(s) or other characteristic distances between surfaces. Accordingly, preferred carbon materials (e.g., powders) are characterized by a porosity (e.g., nanopores or ultramicropores) of the same diameter account for at least about 10% of the total porosity, such as at least about 20%, at least about 30%, at least about 40%, at least about 50%, at least about 60%, at least about 70%, at least about 80%, or at least about 90%.

Measuring adsorption isotherm of a material can be useful to characterize the surface area, porosity, e.g., external porosity, of the carbon material. Carbon powders having a surface area between about 1 $m^2/g$ and 3000 $m^2/g$ are particularly preferred. Carbon powders having an ultramicropore surface area of at least about 50 $m^2/g$, preferably at least about 300 $m^2/g$, at least about 400 $m^2/g$, at least about 500 $m^2/g$ or higher are particularly preferred. Activated or engineered carbons, and other quality carbon sources, can be obtained with a surface area specification. Surface area can be independently measured by BET surface adsorption technique.

Surface area correlation with metal deposition was explored in a number of experiments. Classical pore surface area measurements, using Micromeritics BET surface area analytical technique with nitrogen gas at 77K (−196.15 C) did not reveal a substantial correlation in the deposition of metal elements at ≥5σ confidence level, or probability of coincidence. However, a correlation with ultramicropores (pores having a dimension or diameter of less than 1 nm) was observed. Without being bound by theory, instantiation is believed to be correlated to resonating cavity features of the ultra-micropore and ultramicropore network such as the distance between surfaces or walls. Features of the ultramicropore, can be predicted from ultramicropore diameter as measured by BET, augmented by density function theory (DFT) models, for example. With the aid of machine learning, more precise relationships between ultramicropore size, distribution, turbostratic features, wall separation and diameter and elemental metal nucleation can be established.

Carbon materials and powders can be obtained from numerous commercial providers. MSP-20X and MSC-30 are high surface area alkali activated carbon materials with nominal surface areas of 2,000-2,500 $m^2/g$ and >3,000 $m^2/g$ and median diameters of 7-13 μm and 60-150 μm respectively (Kansai Coke & Chemicals Co). Norit GSX is a steam-washed activated carbon obtained from Alfa Aesar. The purified carbon forms used in the experimental section all exceed ≥99.998 wt % C (metals basis).

Modifying the surface chemistry of the carbon can also be desirable. For example, improved performance was observed when conditioning the carbon with an acid or base. Contacting the carbon with a dilute acid solution selected from the group consisting of HCl, HF, HBr, HI, sulfuric acid, phosphoric acid, carbonic acid, and nitric acid followed by washing with water (such as deionized water) can be beneficial. The acid is preferably in an amount less than about 30%, less than about 25%, less than about 20% less than about 15%, less than about 10%, or less than about 5%, preferably less than or equal to 1% vol. The preferred acid for an acid wash is an acid having a pKa of less than about 3, such as less than about 2. After washing, it can be beneficial to subject the carbon to a blanket of a gas, such as helium, hydrogen or mixtures thereof. Alternative gases include carbon monoxide, carbon dioxide, nitrogen, argon, neon, krypton, helium, ammonia and hydrogen. The carbon can also be exposed to a base, such as KOH before or after an acid treatment.

Controlling residual water content in the carbon which may include moisture can improve performance. For example, the carbon material can be placed in an oven at a temperature of at least about 100° C., preferably at least about 125° C., such as between 125° C. and 300° C. for at least 30 minutes such as about an hour. The oven can be at ambient or negative pressure, such as under a vacuum. Alternatively, the carbon material can be placed in an oven with high vacuum at a temperature of at least about 250° C., preferably at least about 350° C., for at least one hour, such as at least 2, 3, 4, 5, or 6 hours. Alternatively, the carbon material can be placed in an oven with high vacuum at a temperature of at least about 700° C., preferably at least about 850° C., for at least one hour, such as at least 2, 3, 4, 5, or 6 hours. Alternatively, the water or moisture can be removed by vacuum or lyophilization without the application of substantial heat. Preferably, the water, or moisture, level of the carbon is less than about 35%, 30%, 25%, 20%, 15%, 10%, 5%, such as less than about 2%, by weight carbon. In other embodiments, the carbon can be exposed to a specific relative humidity (RH) such as 0.5%, 1%, 2%, 5%, 12% RH or 40% RH or 70% RH or 80% RH or 90% RH, for example, at 22° C.

Pre-treatment of the carbon material can be selected from one or more, including all, the steps of purification, humidification, activation, acidification, washing, hydrogenation, drying, chemistry modification (organic and inorganic), and blending. For example, the carbon material can be reduced, protonated or oxidized. The order of the steps can be as described, or two or more steps can be conducted in a different order.

For example, MSP-20X was exposed to an alkali (C:KOH at a molar ratio of 1:0.8), activated at 700° C. for 2 hours, washed with acid and then hydrogenated to form MSP-20X Lots 1000 when washed with HCl and 105 when washed with HNO3. MSP-20X was washed with acid and then hydrogenated to form MSP-20X Lots 1012 when washed with HCl and 1013 when washed with HNO3. Activated carbon powder developed for the storage of hydrogen was HCl acid washed, then subjected to HNO3 washing and hydrogenation to form APKI lots 1001 and 1002, as substantially described in Yuan, *J. Phys. Chem. B* 200811246143145-14357]. Poly(ether ether ketone) (PEEK, Victrex 450P) and poly(ether imide) (PEI, Ultem® 1000) was supplied by thermally oxidized in static air at 320° C. for 15 h, and carbonized at the temperature range of 550-1100° C. in nitrogen atmosphere, at the carbon yield of 50-60 wt %. These carbons were then activated by the following procedures: (1) grind the carbonized polymer with KOH at KOH/carbon ~1/1-1/6 (w/w), in the presence of alcohol, to form a fine paste; (2) heat the paste to 600-850° C. in nitrogen atmosphere for 2 h; (3) wash and rinse with DI water and dry in vacuum oven. PEEK/PEI (50/50 wt) blend was kindly supplied by PoroGen, Inc. Likewise, the acid washing sequence of Lots 1001 and 1002 was reversed to form APKI lots 1003 and 1004. Universal grade, natural graphite, ~200 mesh was purchased from Alfa Aesar, product number 40799. Graphite lots R and Z were HCl washed and hydrogenated to form R lot 1006 and Z lot 1008, respectively. Alfa Aesar graphite R and Z were nitric acid washed and hydrogenated to form R lot 1007 and Z lot 1009, respectively. MSC-30 (Kansai Coke and Chemicals) was acid washed and then hydrogenated to form MSC30 lots 1010 when washed with HCl and 1011 when washed with HNO3. MSC-30 was exposed to an alkali (C:KOH at a molar ratio of 1:0.8), activated at 700 C for 2 hours, HCl or nitric acid washed and then hydrogenated to form MSC-30 lots 1014 (HCl washed) and 1015 (HNO3 washed), respectively. MSP-20X, MSC-30, Norit GSX and Alfa Aesar R were subjected to purification by MWI, Inc. for MSP-20X Lots 2000 and 2004, MSC-30 Lots 2001, 2006 and 2008, Norit GSX Lots 2005 and 2007, and Alfa Aesar R Lot 2009 respectively. MSP-20X Lot 2000 and MSC-30 2001 were HCl washed and hydrogenated to form MSP-20X Lot 2002 and MSC-30 Lot 2003, respectively. Alfa Aesar R was washed with 1%, 5%, 10%, 15%, 20%, 25%, and 30% HCl (vol.) and then hydrogenated to for R Lot Graphite n % vol HCl, respectively. Purified MSP-20X (Lot 2006) was similarly washed by HCl, nitric acid, HF or $H_2SO_4$ to form MSP-20X 1% HCl, MSP-20X 1% HNO3, MSP-20X 0.4% HF, MSP-20X 0.55% $H_2SO_4$ (Lot 1044), respectively. Purified Norit GSX (Lot 2007) was similarly washed by nitric acid, HF or $H_2SO_4$ to form Norit GSX 1% $HNO_3$ (Lot 1045), Norit-GSX 0.4% HF, Norit-GSX 0.55% $H_2SO_4$, respectively. Purified MSC30 (Lot 2008) was similarly washed by HCl and $H_2SO_4$ to form MSC30 1% HCl, and MSC30 5% $H_2SO_4$. Purified MSP20X (Lot 2006), Norit GSX (Lot 2007) and MSC30 (Lot 2008) were hydrogenated. Purified MSP-20X, Norit GSX and MSC30 were washed with 1% HCl using methanol as a wetting agent. APKI-S-108 Lots 1021-1024 were recycled. The Ref-X Blend is a 40% Alfa Aesar R:60% MSP-20X (lot 2006) 850° C. desorb then $CO_2$ exposure at 138 kPa (20 psi) for 5 days.

It is preferred to degas the nanoporous carbon powder prior to initiating the process. For example, the nanoporous carbon powder can be degassed by subjecting the powder to a vacuum. A range of vacuums can be used, with or without elevated temperatures. It has been found that applying a vacuum of about $10^{-2}$ torr to $10^{-6}$ torr was sufficient. The powder can be degassed prior to charging the powder into the reactor chamber. Preferably the powder can be degassed after the powder is charged into the reactor chamber. In the examples below, which are non-limiting, the carbon powder is charged into the reactor chamber, placed into the reactor assembly and the entire reactor assembly is subjected to a degassing step by maintaining the reactor assembly under vacuum. The degassing step can be performed at ambient temperature or an elevated temperature. For example, good results were achieved at a temperature of 400 C. Other temperatures can be at least 50 C, such as at least 100 C, at least 150 C, at least 200 C, or at least 300 C. The degassing step can be maintained for at least 30 minutes, such as at least 45 minutes, at least 60 minutes, at least 4 hours, at least 6 hours, at least 12 hours, or at least 24 hours. Degassing the carbon powder ensures that contaminant elements have been removed from the system.

The carbon can be recycled or reused. In recycling the carbon, the carbon can optionally be subjected to an acid wash and/or water removal one or more times. In this embodiment, the carbon can be reused one or more times, such as 2, 3, 4, 5, 10, 15, 20, or about 25 or more times. The carbon can also be replenished in whole or in part. It has been discovered that recycling or reusing the carbon can enhance metal nanostructure yields and adjust nucleation characteristics enabling change in element selectivity and resultant distributions. Thus, an aspect of the invention is to practice the method with recycled nanoporous carbon powder, e.g., a nanoporous carbon powder that has been previously subjected to a method of the invention one or more times.

Nanoporous Carbon Compositions

The nanoporous carbon compositions produced by the processes described herein possess several surprising and unique qualities. The nanoporosity of the carbon powder is generally retained during processing and can be confirmed, for example, visually with a scanning electron microscope or modeled by BET analysis. Visual inspection of the powder can identify the presence of elemental nanostructures residing within and surrounding the nanopores. The nanostructures are typically elemental metals. Visual inspection of the powder can also identify the presence of elemental macrostructures residing within and surrounding the nanopores. The macrostructures are typically elemental metals and often contain interstitial and/or internal carbon, as generally described by Inventor Nagel in U.S. Pat. No. 10,889,892, which is incorporated herein by reference, in its entirety. Methods for instantiating gases are described in U.S. Ser. No. 63/241,697 by Inventor Nagel, which is incorporated herein by reference in its entirety.

Typically, the porosity of the nanoporous carbon compositions will be at least about 70% of the porosity attributed to ultramicropores of the nanoporous carbon powder starting, or charge, material and having a total void volume that is about 40% or more of the bulk material volume. The pores, or cavities, residing within the carbon particles can be macropores, micropores, nanopores and/or ultra-micropores. A pore can include defects in electron distribution, compared to graphene, often caused by changes in morphology due to holes, fissures or crevices, edges, corners, swelling, dative bonds, or other changes in surface chemistry, such as the addition of chemical moieties or surface groups, etc. For example, the spaces that may arise between layers of carbon sheets, fullerenes, nanotubes, or intercalated carbon are contemplated. It is believed that instantiation preferentially occurs at or within a pore and the nature of the surface characteristics can impact the deposit. For example, Micromeritics enhanced pore distribution analysis (e.g., ISO 15901-3) can be used to characterize the carbon. It is preferred that the carbon powder is nanoporous. It has now been surprisingly found that hydrogen and other light materials can be instantiated and collected in the gas stream.

Methods and Apparatus

Conceptually, the apparatus for baseline experimentation can be broken into two primary areas: Gas Processing and Reactor Assembly.

Gas Processing:

The gas processing section controls gas composition and flow rate, with the optional embedding of electromagnetic (e.g., light) information or electromagnetic gas pre-treatment to the reactor. The invention includes an electromagnetic embedding enclosure (E/MEE or EMEE), or apparatus, for processing a gas (feed gas or first gas composition, used interchangeably herein) comprising or consisting of:
- a central processing unit and power supply;
- one or more gas supplies;
- a housing having a housing inlet and housing outlet;
- an upstream gas line that is in fluid connection with each gas supply and the housing inlet;
- an internal gas line in fluid connection with the housing inlet and housing outlet;
- a downstream gas line in fluid connection with the housing outlet;
- at least one pencil lamp positioned below the internal gas line, at least one pencil lamp positioned above the internal gas line and/or at least one pencil lamp positioned to the side of the internal gas line;
- an optional short wave lamp and/or a long wave lamp; and
- an optional coil wrapped around the internal gas line, operably connected to a frequency generator;
- wherein each lamp is independently rotatably mounted, located along the length of the internal gas line, and powered by the power supply; and
- wherein the central processing unit independently controls powering the frequency generator, if present, and each lamp and the rotation position of each lamp.

Feed gases can preferably be research grade or high purity gases, for example, as delivered via one or more gas supplies, such as a compressed gas cylinder. Examples of gases that can be used include, for example, air, oxygen, nitrogen, helium, neon, argon, krypton, xenon, ammonium, carbon monoxide, carbon dioxide and mixtures thereof. Preferred gases include nitrogen, helium, argon, carbon monoxide, carbon dioxide and mixtures thereof. Nitrogen, air and helium are preferred. In the examples below, a highly purified nitrogen gas was used. The use of highly purified nitrogen gas facilitated product gas analysis. The feed gas can be added continuously or discontinuously, throughout the process.

One or more gases (e.g., 2, 3, 4, 5, or more gases) can optionally pass through a gas manifold comprising mass flow meters to produce a first gas composition, also called the reactor feed gas. The reactor feed gas may then either by-pass an electromagnetic (EM) embedding enclosure (E/MEE) or pass through one or more E/MEEs. The E/MEE exposes the reactor feed gas to various electromagnetic field (EMF) sources. Flow rates, compositions, and residence times can be controlled. The rate of flow of the reactor feed gas can be between 0.01 standard liters per minute (SLPM) and 10 SLPM, or 100 SLPM or more. A constant flow of gas can maintain a purged environment within the reactor. The schematics shown in FIG. 1 depicts a flow path for the gases through a sample E/MEE. The sample E/MEE comprises a series of lights and coils that can optionally expose the reactor feed gas to EM radiation. EMF sources within the E/MEE can be energized simultaneously or in sequence or a combination thereof.

FIG. 1 is an illustration of an E/MEE of the invention. Gas enters the E/MEE via the inlet 101, or entrance, in line 102 and exits at the outlet, or exit, 110. The inlet 101 and outlet 110 may optionally have valves.

Line 102 can be made of a transparent or translucent material (glass is preferred) and/or an opaque or non-translucent material, such as stainless steel or non-translucent plastic (such as TYGON® manufactured by Saint-Globain Performance Plastics) or a combination thereof. Using an opaque material can reduce or eliminate electromagnetic exposure to the gas as the gas resides within the line. The length of line 102 can be between 50 cm and 5 meters or longer. The inner diameter of line 102 can be between 2 mm and 25 cm or more. Line 102 can be supported on and/or enclosed within a housing or substrate 111, such as one or more plates, with one or more supports 112. For example, substrate 111 can be configured as a plane or floor, pipe or box. Where the substrate is a box, the box can be characterized by a floor, a ceiling and side walls. The box can be closed to and/or insulated from ambient EM radiation, such as ambient light.

One or more lamps (such as 2, 3, 4, 5, 6, 7, 8, 9, 10 lamps or more) can be configured within the E/MEE. Lamps (numbered individually) are preferably pencil lamps characterized by an elongated tube with a longitudinal axis. The pencil lamps can independently be placed such that its longitudinal axis is (i) parallel to the line 102, (ii) disposed radially in a vertical plane to the line 102, or (iii) perpendicular to the plane created along the longitudinal axis of the line 102 or along the vertical axis of the line 102.

Each lamp can, independently, be fixed in its orientation by a support 112. Each lamp can, independently, be affixed to a pivot 113 to permit rotation from a first position. For example, the lamps can be rotated between about 0 and 360 degrees, such as about 45, 90, 135, 180, 225 or 270 degrees, preferably about 90 degrees relative to a first position. The rotation can be with respect to the x, y, and/or z axis wherein (i) the x-axis is defined as the axis parallel to the gas line and its vertical plane, (ii) the y-axis defining the axis perpendicular to the gas line and parallel to its horizontal plane, and (iii) the z-axis is defined as the axis perpendicular to the gas line and parallel to its vertical plane.

Referring to the specific pencil lamps within an E/MEE, line 102 is configured along the E/MEE with gas flowing from the inlet 101 and exiting at the outlet 110. Lamp 103, a neon lamp, is first and is shown above line 102 oriented to be along the z-axis and perpendicular to line 102, with the tip of the lamp pointed towards line 102. Lamp 109, a krypton lamp, is shown below line 102 oriented to be parallel to the x-axis, with the tip pointing towards the outlet 110. Lamps 104 and 105, a long wave and short wave lamp, respectively, are shown parallel to line 102 oriented to be along the x-axis with the tips pointing towards the inlet. Lamp 122, an argon lamp, is shown to be below line 102 oriented to be parallel to the x-axis, with the tip pointing towards the inlet 101 at approximately the same distance from the inlet as lamps 104 and 105. Lamp 106, a neon lamp, is downstream at about the midpoint of the E/MEE, is above line 102 with the tip pointing down. Lamp 107, a xenon lamp, is shown downstream of lamp 106 above line 102, parallel to the x axis of line 102 and points toward the outlet 110. Lamp 108, an argon lamp, is below line 102 and the tip is pointing toward line 102 along the z-axis. Optional coil 120 is wrapped around line 102. Each of these lamps can be independently rotated, for example, 90 degrees along any axis. Each lamp is connected to a power supply or power source to turn on or off the power. Each lamp can be independently rotated 1, 2, 3, 4 or more times during the process. For convenience, each lamp is held by a pivot that can be controlled by a central processing unit, such as a computer programmed to rotate the pivot and provide power to each lamp. For the ease of describing the experimental procedures, each orientation of each lamp is called "position n" wherein n is 0, 1, 2, 3, 4, or more. As the procedure is conducted, each lamp can be powered for specific periods of time at specific amperage(s) and positioned or repositioned.

In the exemplification described below, the initial bulb position for each lamp is described with a degree. A zero degree (0°) reference point is taken as the 12 o'clock position on the glass pipe when looking down the gas pipe in the direction of intended gas flow (e.g., when looking at the E/MEE exit). The length of the glass pipe or line is taken as the optical length (e.g., in this instance 39 inches). For example, 6 inches from the end is defined as 6 inches from the optical end of pipe.

The lamps can be placed above, below, or to the side (for example, level with the longitudinal axis or a plane parallel to (above or below) the longitudinal axis), for example, of line 102. The lamps can be independently placed between 5 and 100 cm from the center of the line 102 in the vertical plane, as measured from the tip of the lamp to the center of line 102. One or more lamps can be placed in the same vertical plane along line 102, as illustrated by lamps 122, 104, and 105. Two lamps are in the same vertical plane if they (as defined by the tip or base of the lamp) are the same distance from the inlet 101. Preferably, lamp 105 can be placed in a plurality of (e.g., 2, 3, 4, 5 or more) vertical planes along the length of line 102 within the E/MEE. Further, one or more lamps can be placed in the same horizontal plane above, below or through line 102, as shown with lamps 104 and 105. Two lamps are in the same horizontal plane if they (as defined by the tip or base of the lamp) are the same distance from the center of line 102. Preferably, lamps can be placed in a plurality of (e.g., 2, 3, 4, 5 or more) horizontal planes along the length of line 102 within the E/MEE, as generally illustrated.

It is understood that "pencil lamps," as used herein, are lamps filled with gases or vapor that emit specific, calibrated wavelengths upon excitation of the vapor. For example, pencil lamps include argon, neon, xenon, and mercury lamps. For example, one or a plurality of lamps can be selected from argon, neon, xenon or mercury or a combination thereof. Preferably, at least one lamp from each of argon, neon, xenon and mercury are selected. Wavelengths between 150 nm and 1000 nm can be selected. One example of a pencil lamp is a lamp characterized by an elongated tube having a tip and a base.

Long wave and/or short wave ultraviolet lamps can also be used. Pencil lamps used in the E/MEE were purchased from VWR™ under the name UVP Pen_Ray® rare gas lamps, or Analytik Jena in the case of the UV short wave lamps.

A power supply is operably connected to independently to each lamp, E/MEE coil, and frequency generator. The power supply can be AC and/or DC.

The E/MEE can be open or enclosed. Where the E/MEE is enclosed, the enclosure is typically opaque and protects the gas from ambient light. The enclosure can be made of a plastic or resin or metal. It can be rectangular or cylindrical. Preferably, the enclosure is characterized by a floor support.

In baseline experimentation the feed gas can by-pass the E/MEE section and are fed directly to the reactor assembly. The energy levels and frequencies provided by the EM sources can vary.

Figure 4A:
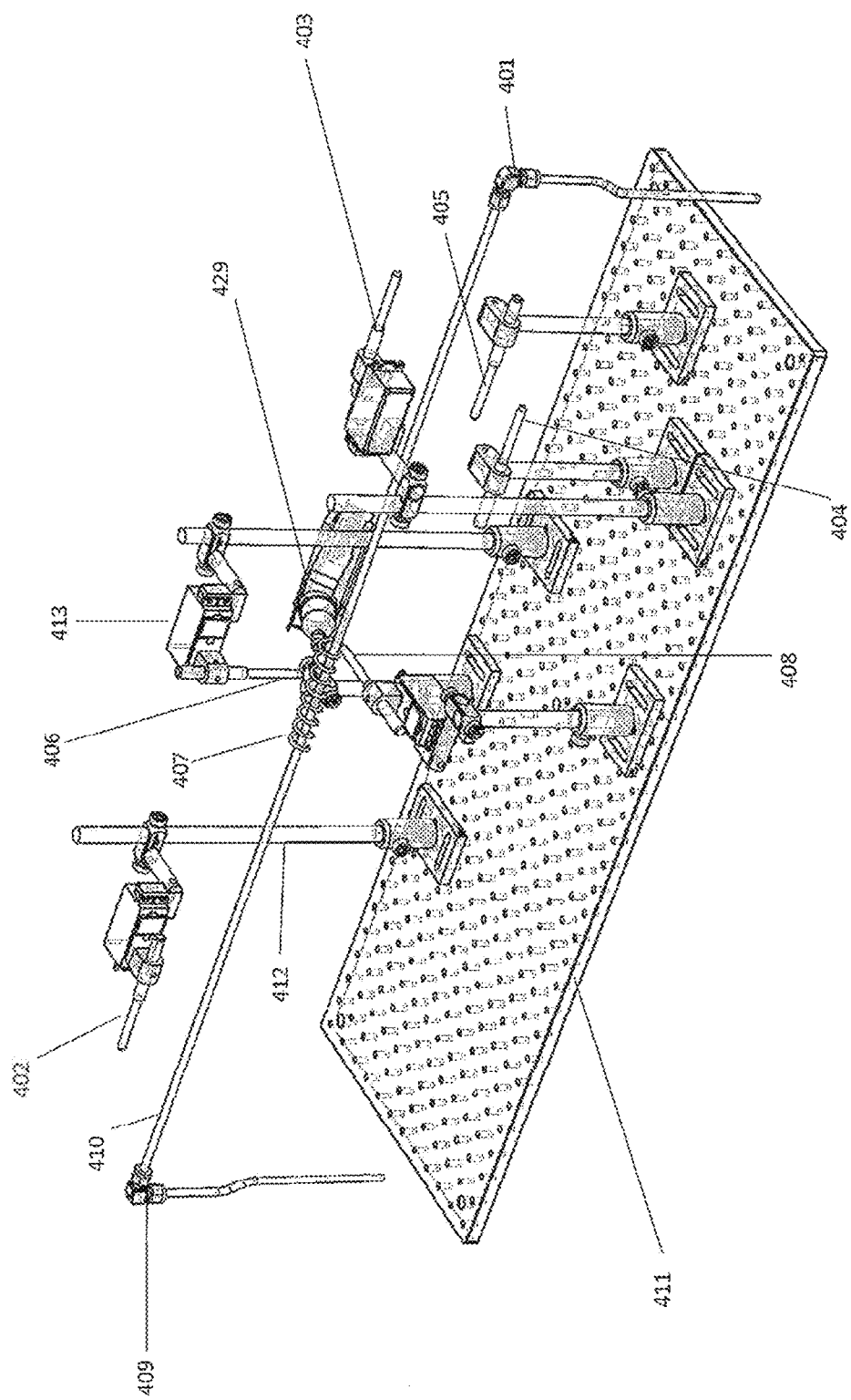
FIG. 4A is a perspective view of an E/MEE of the invention used in carbon pretreatment.

FIG. 4A provides a second illustration of an E/MEE of the invention. Gas enters the E/MEE at inlet 401 and exits at outlet 409 along line 410. Pencil lamp 402 and Pencil lamp 403 are shown parallel to and above line 410 along the vertical plane through line 410 axis. Pencil lamps 404 and 405 are parallel to and below line 410 in the same horizontal plane equidistant from the vertical plane through line 410. Pencil lamp 406 is shown above and perpendicular to line 410, positioned along the z axis. An optional coil 407 is a conductive coil wrapped around line 410. Pencil lamp 408 is shown below and perpendicular to line 410 along the y axis. Substrate 411 provides a base for supports 412. Pivots 413 control the position of each pencil lamp and permit rotation along axis x, y and z. An optional x-ray source 429 is also shown directed towards the coil 407.

The coil 407 is preferably made of conducting material and is connected to a power supply and, optionally, a frequency generator. The coil can comprise copper, aluminum, platinum, silver, rhodium, palladium or other metals or alloys (including braidings, platings and coatings) and can optionally be covered with an insulating coating, such as glyptal. It can be advantageous to use a braid of 1, 2, 3 or more metal wires. The coil can be manufactured from wire typically used in an induction coil and can vary in size and the number of turns. For example, the coil can comprise, 3, 4, 5, 6, 7, 8, 9, 10 or more turns. The inner diameter of the coil can be between 2 cm and 6 cm or more and preferably snugly fits the line 410. The wire used can have a diameter of between 5 mm and 2 cm.

An x-ray source 429 can included in the E/MEE. For example, the x-ray source can be directed at line 410 along the line between the inlet 401 and outlet 409. For example, it can be advantageous to direct the x-ray source at coil 407, where present.

Reactor Assembly (RA):

The invention further relates to a reactor assembly comprising:

A gas inlet and one or more gas outlets;

A reactor chamber, preferably containing a nanoporous carbon material or powder;

A first porous frit defining a floor of the reactor chamber,

A second porous frit defining the ceiling of the reactor chamber; wherein each porous frit has a porosity that is sufficient to allow a gas to permeate into the reactor chamber and contain a nanoporous carbon material;

An optional reactor cup defining side walls of the reactor chamber;

An optional reactor cap positioned above the second porous frit;

A reactor body disposed below the first porous frit;

A reactor head space disposed above the reactor cap;

An optional foil disposed between the reactor chamber and reactor cup;

One or more coils surrounding the reactor body and/or the reactor chamber operably connected to a power supply and/or frequency generator;

An optional x-ray source configured to expose the reactor head space to x-rays;

One or more optional lasers configured to direct a laser towards a frit and/or through the reactor chamber;

A computer processing unit configured to control the power supply, frequency generator, lamps, lasers and x-ray source, when present.

The invention also includes a reactor assembly comprising:

A gas inlet and one or more gas outlets;

A reactor chamber, preferably containing a nanoporous carbon material;

A first porous frit defining a floor of the reactor chamber,

A second porous frit defining the ceiling of the reactor chamber; wherein each porous frit has a porosity that is sufficient to allow a gas to permeate into the reactor chamber and contain a nanoporous carbon material;

A reactor head space disposed above the reactor cap;

2, 3, 4, 5 or more RA coils surrounding the reactor chamber and/or reactor head space operably connected to an RA frequency generator and power supply;

2, 3, 4, 5 or more pairs of lamps wherein the pairs of lamps are disposed circumferentially around the RA coils and define a space between the pairs of lamps and the RA coils;

An optional x-ray source configured to expose the reactor chamber to x-rays;

One or more optional lasers configured to direct a laser through the reactor chamber; and A computer processing unit configured to control the power supply, frequency generator and the optional x-ray source and lasers.

The invention also includes a reactor assembly comprising:

A gas inlet and one or more gas outlets;

A reactor chamber, preferably containing a nanoporous carbon material;

A first porous frit defining a floor of the reactor chamber,

A second porous frit defining the ceiling of the reactor chamber; wherein each porous frit has a porosity that is sufficient to allow a gas to permeate into the reactor chamber and contain a nanoporous carbon material;

A reactor head space disposed above the reactor chamber;

An induction coil surrounding the reactor chamber and/or reactor head space operably connected to a power supply;

A computer processing unit configured to control the power supply. The reactor chamber can optionally contain a cap and/or cup to contain the carbon material.

Figure 2A:
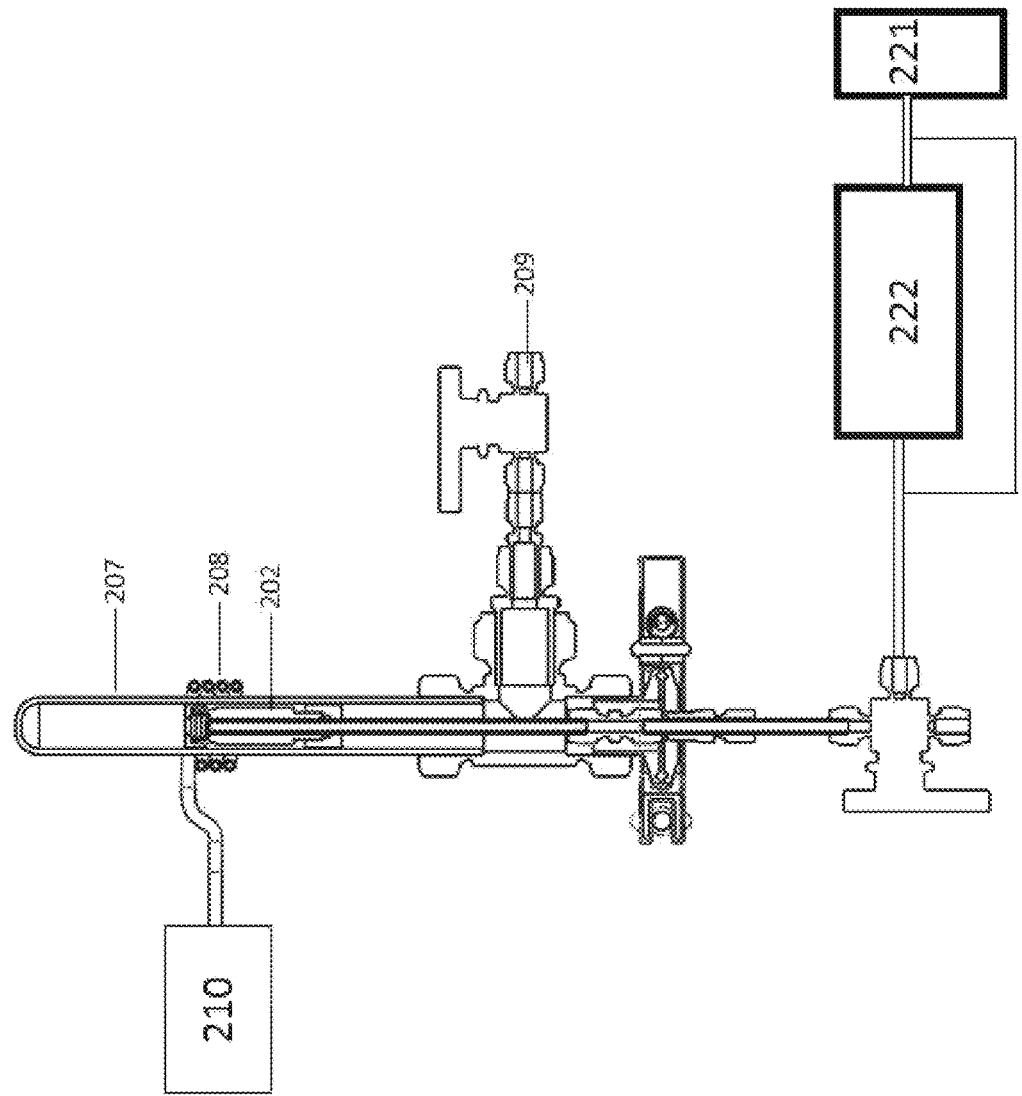
FIGS. 2A and 2C show reactor assembly components.
Figure 2B:
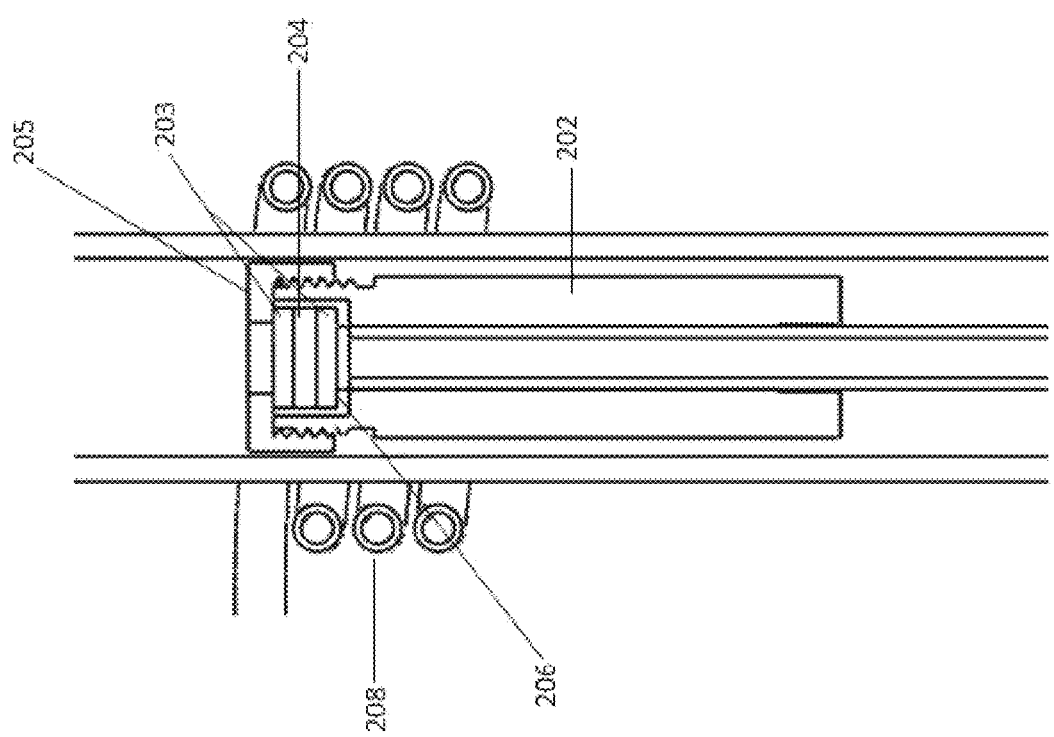
FIG. 2B is an expanded view of the reactor assembly components of FIG. 2A.

As shown in FIGS. 2A and 2B, the reactor assembly comprises a reactor body 202 and starting, or charge, material 204 (which is generally a nanoporous carbon powder) and is located downstream of the gas sources 221 and E/MEE 222, as shown in FIG. 2A. As described above, it is possible for reactor feed gas to bypass the E/MEE. The reactor body 202 can be a packed bed tubular micro-reactor surrounded by one or more conducting coils 208, as illustrated in FIG. 2B, a cross section of the reactor assembly.

The conducting coil 208 can be manufactured from electrically conducting material, such as copper, aluminum, platinum, silver, rhodium, palladium or other metals or alloys (including braidings, platings and coatings) and can optionally be covered with an insulating coating, such as glyptal. The coil can be manufactured from wire typically used in an induction coil and can vary in size and the number of turns. For example, the coil can comprise 3, 4, 5, 6, 7, 8, 9, 10 or more turns. The inner diameter of the coil can be between 2 cm and 6 cm or more and preferably snugly fits the reactor body containment 207. The wire used can have a diameter of between 5 mm and 2 cm.

Figure 5A:
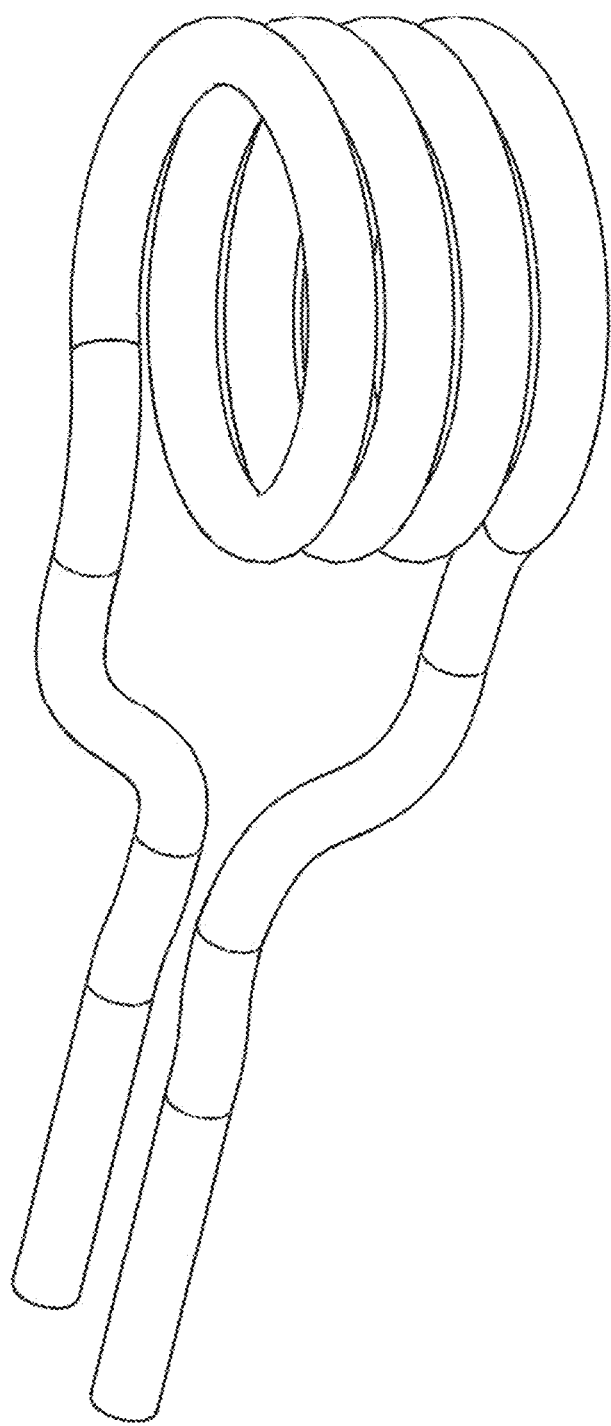
FIG. 5A illustrates one conformation for a standard coil.
Figure 5B:
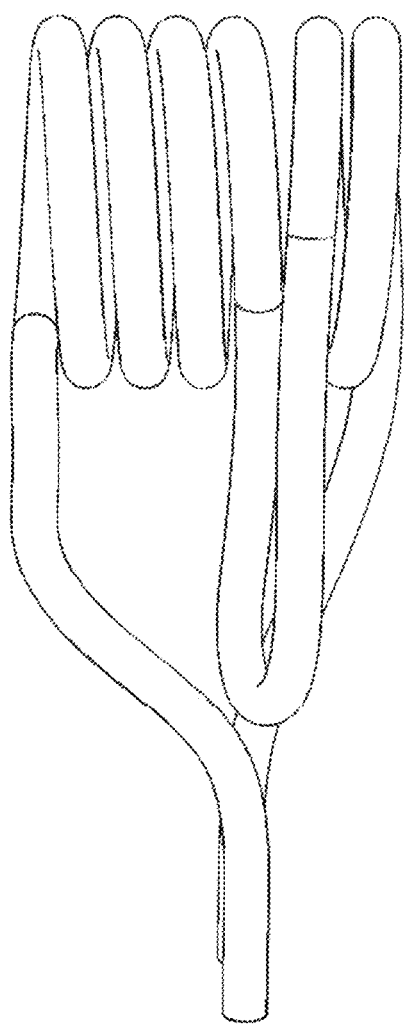
FIG. 5B illustrates one conformation for a reverse field coil.

Each conducting coil 208 (or coil) can generate inductive heat and, optionally, a magnetic field. Standard induction coils or reverse field induction coils (coils that have a lower and upper sections connected through an extended arm that allows the sections to be wound in opposite directions, thereby producing opposing magnetic fields) are preferred. The coil 208 can be water-cooled via a heat exchanger. The coil can be connected to a power flange 210, which can be water cooled as well and in turn can connect to a power supply, such as an Ambrell 10 kW 150-400 kHz power supply. In baseline experimentation a standard coil was used with simple copper windings. The windings can form a coil such that the connection to the power supply is at opposite ends of the coil FIG. 5A or the coil can return such that the connection to the power supply are adjacent, as shown in FIG. 5B.

The reactor assembly can optionally further comprise one or more coils 208, preferably surrounding the reactor body and its containment system. For example, the reactor assembly can comprise 1, 2, 3, 4, 5, 6, 7, 8, 9, or 10 or more coils, also called RA coils. As shown in FIG. 2B, one or more electromagnetic (E/M) coils can be used to provide magnetic fields. Preferably, 1, 2, 3, 4, or 5 or more E/M coils can be used, more preferably 3, 4, or 5 E/M coils. FIG. 3 shows groupings of three coils, for example, which can generally be numbered 1, 2, or 3, from top to bottom. A grouping of coils, as shown in FIG. 3A-3E, can be called a boundary. Where a plurality of groupings is used, the number of coils used is independently selected. Further, the groupings can be equidistantly spaced along or irregularly spaced.

Coils can be manufactured from electrically conducting materials, such as copper, platinum, silver, rhodium, palladium and, wire braids or coated wires of two or more materials. Each coil in a grouping may be made of the same material or different. For example, a grouping can be made such that each coil is made of a different material. For example, a braiding of copper wire and silver wire can be used. Silver plated copper wire can be used. A first RA coil can be made of a copper winding. A second RA coil can be a copper/silver braid. A third RA coil can be a platinum wire winding. An RA coil can be configured to create a magnetic field and wherein each power supply independently provides AC and/or DC current. Any one or all RA coils can be optionally lacquered.

The coils are preferably circular in geometry. However, other geometries, such as rounded shapes, ellipses and ovoids can be used. The wire diameter can be between about 0.05 mm (>about 40 gauge) and about 15 mm (about 0000 gauge) or more. For example, the wire diameter can be between about 0.08 mm (about 40 gauge) and about 0.8 mm (about 20 gauge) wire. Excellent results have been obtained using 0.13 mm (36 gauge) wire. Coils can be wire windings (e.g., the wire can be wound in 1, 2, 3, 4, 5, 6, 7, 8, 9, 20, or more turns or can be a single turn. When the coil is made with a single winding, the diameter or width of the wire can preferably be 10 mm or more in diameter. In this context, a "wire" can also be considered a band where the width of the material is greater than the depth. FIG. 3 provides illustrations or views of various coils and groupings of coils. A wire coil can be made of a single wire, a wire alloy or two or more wires. For example, two wires comprising different metals can be wound or braided together.

The inner diameter (or dimension(s) where the coil is not a circle) of each coil can be the same or different and can be between 2 and 200 cm.

Coils 208 can independently be connected to one or more power supplies, such as an AC or DC power supply or combination thereof. For example, an AC current can be supplied to alternating (1, 3, and 5, for example) or adjacent coils (1, 2 and/or 4, 5, for example) while DC current is supplied to the remaining coils. Current can be provided (independently) in a frequency, such as in a patterned frequency, e.g., triangle, square or sine pattern or combination thereof. The frequency supplied to each coil can be the same or different and between 0 to 50 MHz or higher. While the coils 208 can generate and transfer thermal energy, or heat, to the reactor feed gas they are predominantly used to create a magnetic field.

The power supply can be an AC and/or DC power supply or combination thereof. Current can be provided (independently) in a frequency, such as in a patterned frequency, e.g., triangle, square or sine pattern or combination thereof. The frequency supplied to each coil can be the same or different and between 0 to 50 MHz or higher, such as between 1 Hz to 50 Mhz.

As described above, the RA coils typically surround the reactor chamber and/or reactor head space. For example, a first RA coil can be aligned with the first (or bottom) frit. A second RA coil can be aligned with the reactor chamber or nanoporous carbon bed. A third RA coil can be aligned with the second (or top) frit. Where present, a fourth RA coil can be disposed between the first RA and the second RA coil. When present, a fifth RA coil can be disposed between the second RA coil and third RA coil. When two or more reactor chambers, or nanoporous carbon beds are present, it can be desirable to add additional RA coils, also aligned with a second or additional reactor chambers or nanoporous carbon beds. Additional RA coils can be added to align with additional frits when present.

The RA coils can typically be supported in a support or stator to maintain a fixed distance between each coil. The support, when present, can be transparent. In one embodiment, the RA coils can be configured in a cartridge that can be removed or moved.

The RA coils can, additionally or alternatively, be aligned with the reactor headspace. The reactor headspace can typically be a volume above the second, or top, frit. It is understood that where the reactor assembly is positioned horizontally (or at some other angle than vertical), the geometry of the spaces is maintained, albeit rotated. The reactor headspace can typically be an enclosed volume. For example, the reactor assembly can be inserted into a closed ended transparent (e.g., glass) tube, vial or bottle. The reactor assembly can be movably engaged with the RA coils (or boundary), thereby permitting each RA coil to align to a different element within the reactor assembly. For example, the first RA coil can be realigned with the reactor chamber.

Reactor body 202 can also be a packed, moving or fluidized bed or other configuration characterized by one or more chambers that receive the charge material 204 and facilitates transfer of a reactor feed gas through the charge material 204 and can transfer thermal and/or electromagnetic energy to the charge material 204. The reactor body 202 is generally contained within a housing, e.g., closed end tube, 207 and frits 203, which function to contain the charge material 204. It can be advantageous to use a reactor within a translucent or transparent housing, such as quartz or other materials characterized by a high melting point. The volume of the reactor bed can be fixed or adjustable. For example, the reactor bed can contain about 1 gram, or less of starting material, between about 1 g to 1 kg of starting material or more. Where the reactor assembly comprises two or more reactor chambers, the reactor chambers are preferably directly or indirectly stacked, preferably having a common central axis and can be separated by one or two frits.

The reactor body 202 can be made of a thermally conductive material, such as graphite, copper, aluminum, nickel, molybdenum, platinum, iridium, cobalt, or niobium, or non-thermally conducting material, such as quartz, plastic (e.g., acrylic), or combinations thereof. An optional cup 206 capped with cap 205 can be advantageous. The cup and cap material can be independently selected. For example, a graphite cup can be combined with a graphite cap, which is the selection for the examples below. A copper cup can be combined with a graphite cap. A graphite cup can be combined with a copper cap. A copper cup can be combined with a copper cap and so on.

The reactor assembly can also receive the gas line through the entrance, or inlet, 201 and to provide an exhaust through an exit, or outlet, 209, optionally controlled by valves. A head space defined by a closed end tube 207 can be configured above the reactor body. The reactor body is preferably made of graphite, copper, or other inorganic rigid material. The gas line is preferably made of an inert tubing, such as glass, acrylic, polyurethane, plexiglass, silicone, stainless steel, and the like can also be used. Tubing can, optionally, be flexible or rigid, translucent or opaque. The inlet is generally below the charge material. The outlet can be below, above or both.

Frits 203 used to define the chamber containing the charge material are also shown. The frits can be made of a porous material which permits gas flow. The frits will preferably have a maximum pore size that is smaller than the particle size of the starting material. Pore sizes of between 2 and 50 microns, preferably between 4 and 15 microns can be used. The thickness of the frits can range satisfactorily between 1 and 10 mm or more. The frits are preferably made of an inert material, such as silica or quartz. Porous frits from Technical Glass Products (Painesville Tp., Ohio) are satisfactory. On the examples below, fused quartz #3 porous frits (QPD10-3) with a pore size between 4 and 15 microns and a thickness of 2-3 microns and fused quartz frits with a pore s1ze between 14 and 40 microns (QPD10-3) were used. The purity of the frits exemplified herein was very high, 99.99% wt, to ensure that the results obtained cannot be dismissed as the result of contamination. Frits of lower purity and quality can also be used. The diameter of the porous frit is preferably selected to permit a snug fit within the reactor interior, or cup. That is, the diameter of the porous frit is approximately the same as the inner diameter of the reactor or cup, if present.

Figure 6B:
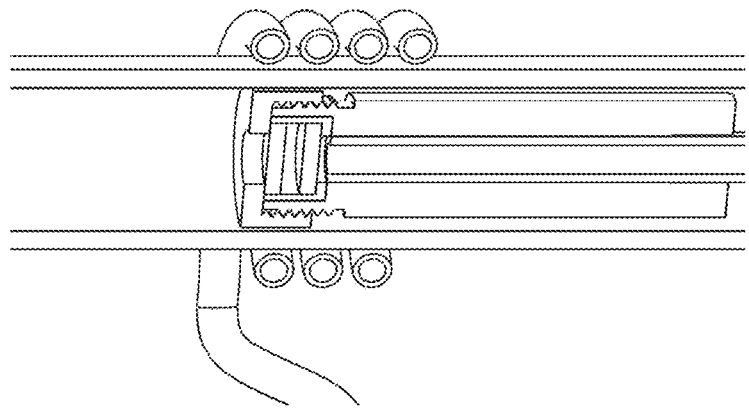

Referring to FIGS. 6A and 6B, a foil can optionally encase the chamber containing the charge material on the inside and/or outside of the frits and/or cup, thereby creating a metal boundary surrounding the starting material. The foil can be a metal, such as copper, platinum, niobium, cobalt, gold, silver, or alloys thereof. The foil can also be graphite or the like. The foil can be between 0 and 0.5 cm thick, preferably 1-10 mm. The profile of the reactor can be linear or it can be configured to contain a constriction below the lower frit, providing the general appearance of a lollipop. The gas line 102 is also shown.

The reactor chamber is sized to contain the desired amount of charge material 204. For the experiments described herein, the chamber is designed to contain between 20 mg to 100 grams of nanoporous carbon powder. Larger reactors can be scaled up.

Figure 4B:
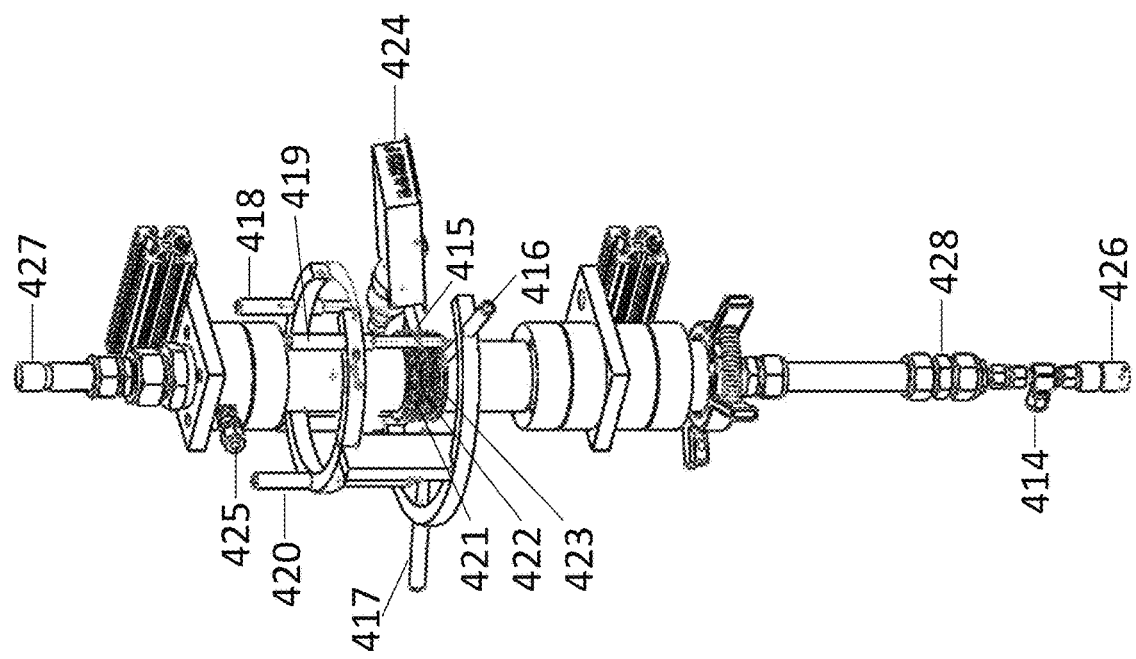
FIG. 4B shows reactor assembly components.

The reactor assembly may be augmented with additional forms of electromagnetic radiation, such as light. FIG. 4B exemplifies light sources 426 and 427 that generate light directed through the reactor housing 415 and starting material contained therein. Preferred light sources 426 and 427 can be lasers and/or can emit light in a wavelength between 10 nm and 1 mm. The light is optionally subjected to one or more filters 428, as shown in the use of light sources (beams) in FIG. 4B. Preferably, the reactor assembly comprises 2, 3, 4, 5 or more pairs of lamps disposed circumferentially around the RA coils. Pencil lamps, such as the lamps used within the E/MEE which is incorporated herein by reference from above, are preferred. The pairs of lamps preferably define a boundary surrounding the coil and are not touching or otherwise adjacent to the coils. Two lamps are considered paired where they are proximal to each other, such as within the same plane with the center axis of an RA coil. Paired lamps can be parallel or orthogonal to each other and the RA coil center axis. Lamps can be considered proximal to each other if the space between any two points between the lamp tip and base is within 10 cm, preferably within 5 cm. Lamps that are positioned orthogonally to the RA coil center axis are generally positioned along the line defined by the radius of one or more RA coils.

The RA lamps, e.g., the pencil lamps proximal to the reactor body, can be matched, or paired, to one or more E/MEE lamps, e.g., the pencil lamps residing within the E/MEE housing and proximal to the gas line. For example, where an E/MEE pencil lamp is a neon lamp, a pair of RA lamps can be neon pencil lamps. Additionally, where an E/MEE pencil lamp is a neon lamp, a pair of RA lamps can be neon pencil lamps. Such matched lamps can emit light characterized by substantially the same wavelength. This can be conveniently achieved by using lamps from the same manufacturer with the same specifications.

The reactor can be in a closed or open housing 415 and can be supported therein by reactor supports. The reactor feed gas is directed to the reactor inlet frit, or bottom frit, directed through the starting material contained within the housing 415 and exits the reactor at the reactor exit frit, or top frit. The reactor feed gas can then be exhausted or recycled, optionally returning to the E/MEE for further treatment.

Figure 2C:
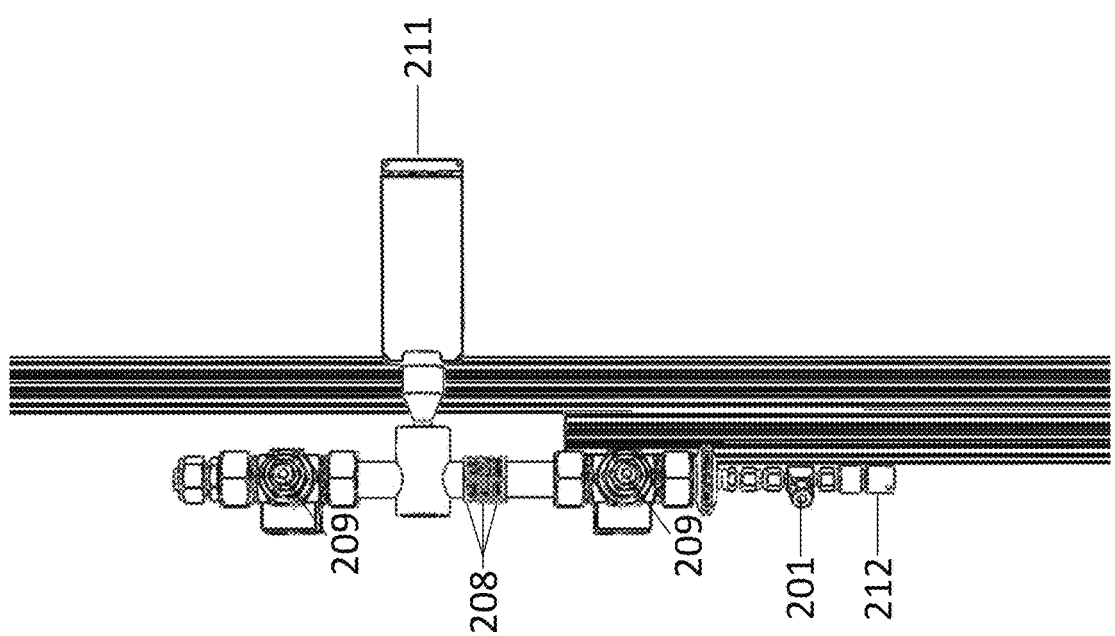

The reactor can further comprise an x-ray source 211 (FIG. 2C) or 424 (FIG. 4B) and/or one or more lasers 212 (FIG. 2C) or 426 and 427 (FIG. 4B). Preferred x-ray sources include a mini-x. The x-ray is preferably directed through the reactor towards a gas headspace, or target holder 213, above the charge material. The x-ray can be directly or indirectly provided from the source, such as by reflecting the x-ray from a foil disposed above or below a frit.

Figure 7A:
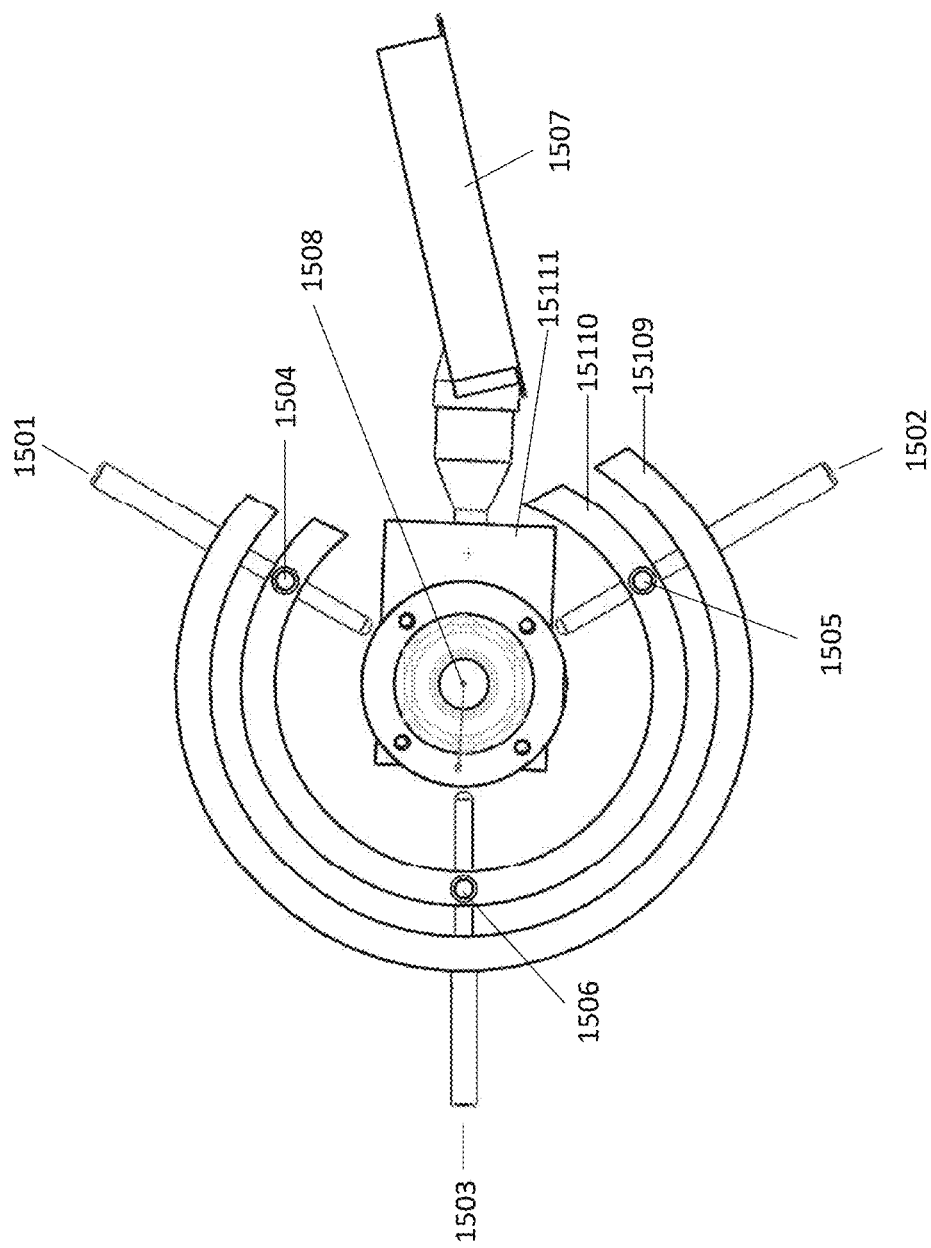
FIGS. 7A-7I illustrate various reactor assembly views according to the invention.

FIG. 7A illustrates a top view of a preferred reactor assembly. Pencil lamp 1501, pencil lamp 1502 and pencil lamp 1503 are shown with the tip directed towards a center axis of the reactor assembly along a radius of the reactor assembly. Pencil lamp 1504, pencil lamp 1505 and pencil lamp 1506 are shown directed parallel to a center axis of the reactor assembly and are disposed in a plane along a radius of the reactor assembly. Pencil lamp 1501, together with pencil lamp 1504, form a first RA lamp pair. Pencil lamp 1502, together with pencil lamp 1505, form a second RA lamp pair. Pencil lamp 1503, together with pencil lamp 1506, form a third RA lamp pair. As with the E/MEE pencil lamps, each RA lamp can be rotated along its x, y or z axis. Each pair can optionally reside within the same radial plane, as shown. Outer support 15109 provides support for the pencil lamps 1501, 1502 and 1503. Inner support 15110 provides support for the pencil lamps 1504, 1505 and 1506. The outer and inner supports are preferably made of non-conductive materials (such as polymers or resins) and are preferably transparent. An optional x-ray source 1507 is shown directing x-rays towards the center axis of the reaction chamber 1508. Reactor connector 15111 is also shown.

Figure 7B:
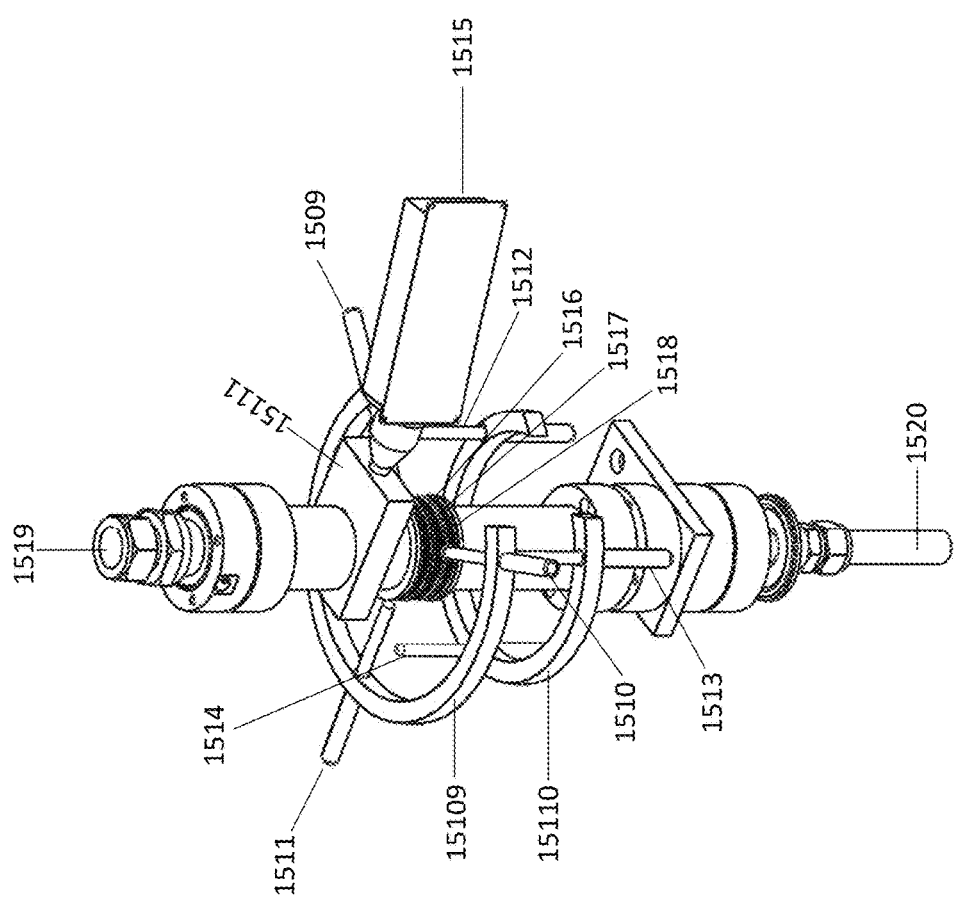

FIG. 7B is a perspective view of this reactor assembly. Pencil lamp 1509, pencil lamp 1510 and pencil lamp 1511 are shown directed with the tip towards a center axis of the reactor assembly along a radius of the reactor assembly. The tip of each lamp aligns with the center, or third, RA coil 1517 and is in the same horizontal plane. Pencil lamp 1512, pencil lamp 1513 and pencil lamp 1514 are shown directed parallel to a center axis of the reactor assembly, disposed in a plane along a radius of the reactor assembly and is characterized by a tip pointing towards top of the reactor, away from the gas inlet 1520. These lamps are illustrated above the horizontal pencil lamps. The length of each pencil lamp align with RA coils 1516, 1517 and 1518. Outer support 15109 and inner support 15110 support the pencil lamps. An optional x-ray source 1515 is shown directing x-rays towards the center axis of the reactor assembly above the third RA coil 1516. Disposed within the reactor assembly can be a reflecting plate to direct the x-ray towards the reaction chamber. Reactor connector 15111 is also shown, as well as other non-material connectors and spacers. Gas inlet 1520 and gas outlet 1519 are also shown.

Figure 7C:
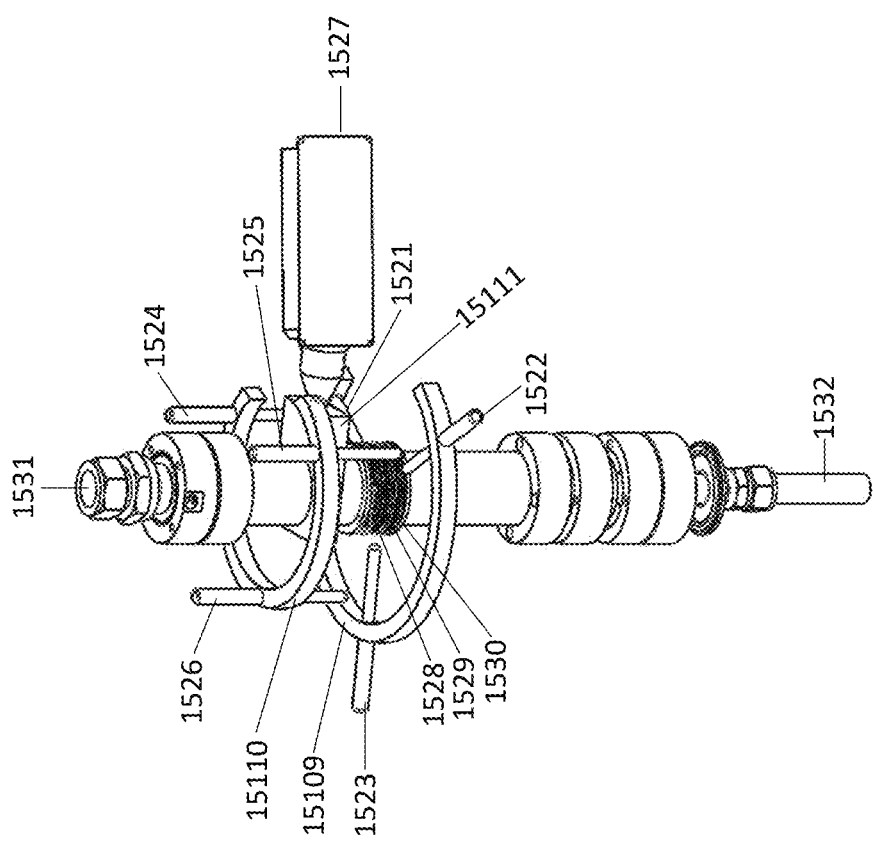

FIG. 7C is a second perspective view of a reactor assembly. Pencil lamp 1521, pencil lamp 1522 and pencil lamp 1523 are shown directed with the tip towards a center axis of the reactor assembly along a radius of the reactor assembly. Pencil lamp 1524, pencil lamp 1525 and pencil lamp 1526 are shown directed parallel to a center axis of the reactor assembly, disposed in a plane along a radius of the reactor assembly and is characterized by a tip pointing towards the bottom of the reactor, towards the gas inlet 1532. These vertical lamps are shown above the horizontal lamps and, again, each pair of lamps can optionally lie in the same radial plane. The tip of each pencil lamp aligns with the third RA coil 1528. Outer support 15109 and inner support 15110 support the pencil lamps. Three RA coils 1528, 1529 and 1530 are shown. An optional x-ray source 1527 is shown directing x-rays towards the center axis of the reactor assembly. Disposed within the reactor assembly can be a reflecting plate to direct the x-ray towards the reaction chamber. Reactor connector 15111 is also shown, as well as other non-material connectors and spacers. Gas inlet 1532 and gas outlet 1531 are also shown.

Figure 7D:
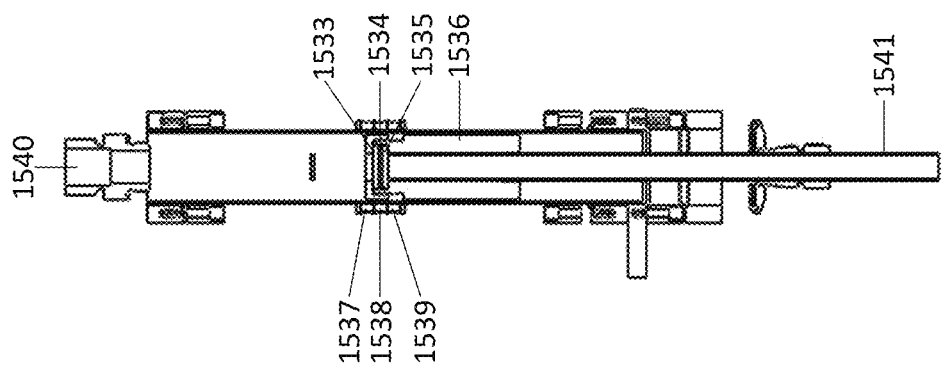

FIG. 7D is a cross sectional side view of the reactor assembly, stripped of the pencil lamps and x-ray source. Gas enters at the inlet 1541 and exits at the outlet 1540. RA coils 1537, 1538 and 1539 are shown. The first, or bottom, frit 1535 and the second, or top, frit 1533 contain the reaction chamber 1534, which can be charged with nanoporous carbon powder. The reactor body 1536 is also shown. Other non-material spacers and connectors remain unlabeled.

Figure 7E:
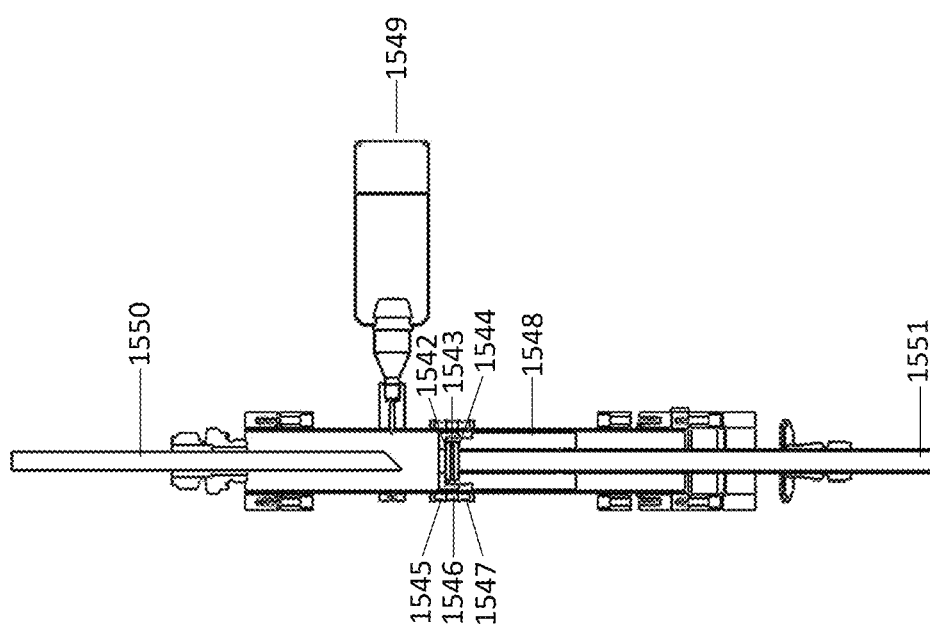

FIG. 7E is a second cross sectional side view of a reactor assembly, stripped of the pencil lamps and x-ray source. Gas enters at the inlet 1551. RA coils 1545, 1546 and 1547 are shown. The first, or bottom, frit 1544 and the second, or top, frit 1542 contain the reaction chamber 1543, which can be charged with nanoporous carbon powder. The reactor body 1548 is also shown. X-ray source 1549 directs x-rays towards the center axis of the reactor assembly which is then deflected towards the reactor chamber with element 1550. Other non-material spacers and connectors remain unlabeled.

Figure 7F:
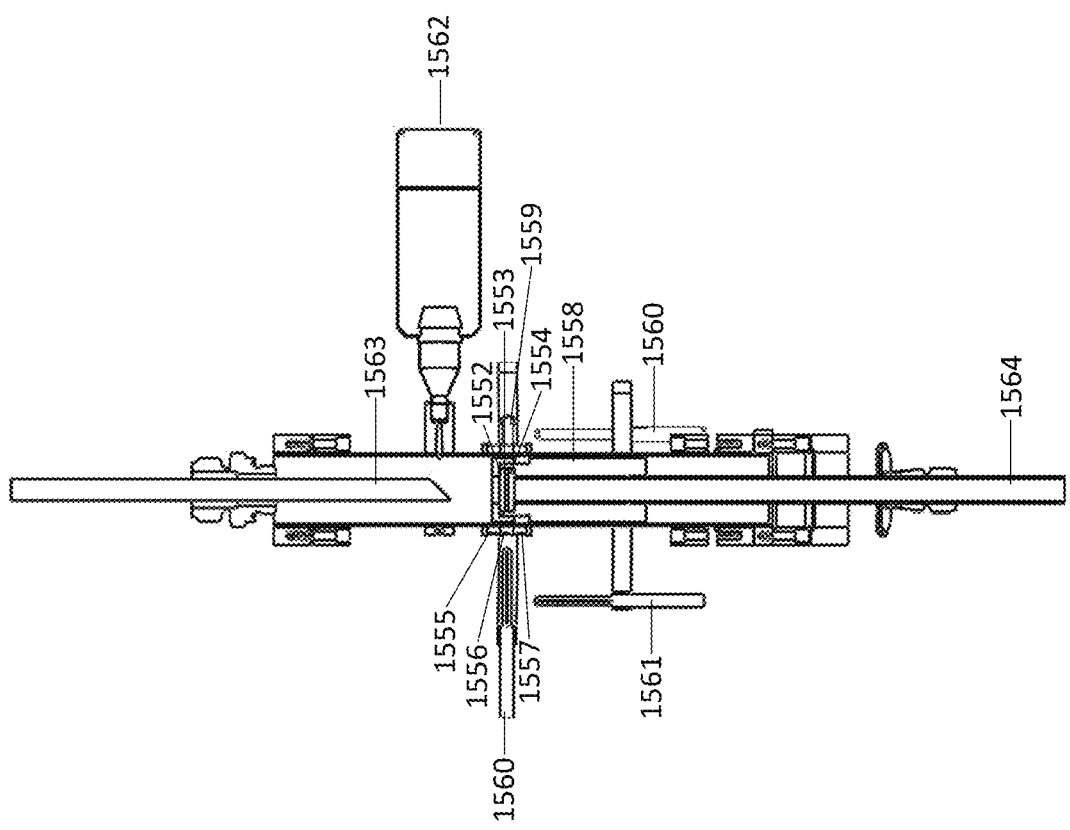

FIG. 7F is a second cross sectional side view of a reactor assembly with the pencil lamps and x-ray source. Gas enters at the inlet 1564. RA coils 1555, 1556 and 1557 are shown. The first, or bottom, frit 1554 and the second, or top, frit 1552 contain the reaction chamber 1553, which can be charged with nanoporous carbon powder. The reactor body 1558 is also shown. Vertical pencil lamps 1560 and 1561 are shown as are horizontal pencil lamps 1560 and 1559. X-ray source 1562 directs x-rays towards the center axis of the reactor assembly which is then deflected towards the reactor chamber with element 1563. Other non-material spacers and connectors remain unlabeled.

Figure 7G:
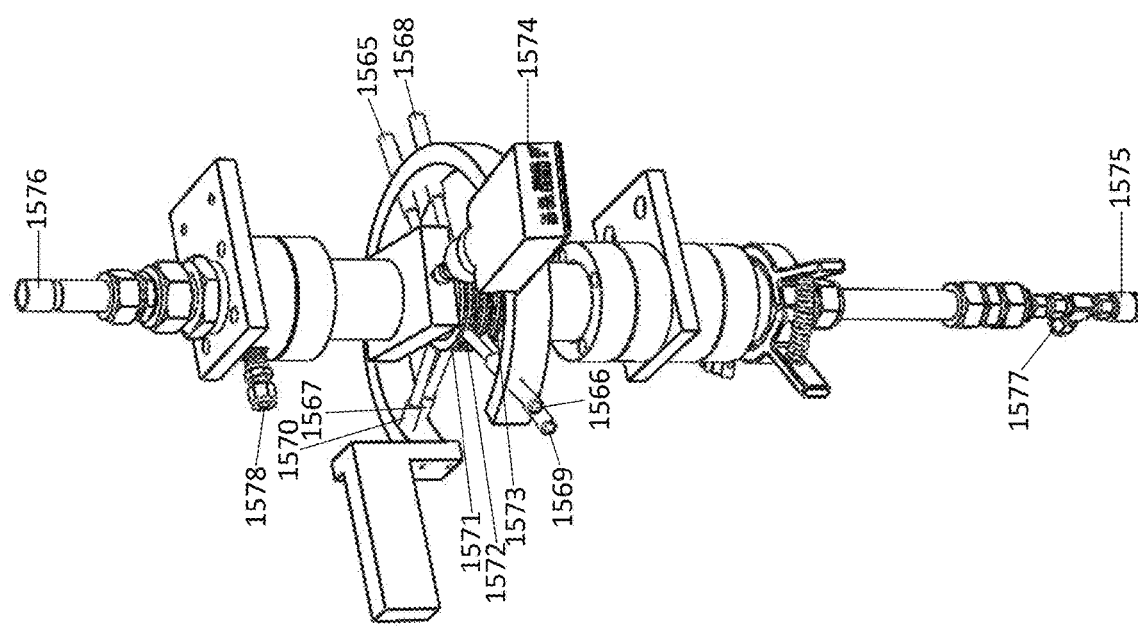

FIG. 7G is a perspective view of a reactor assembly with the pencil lamps and x-ray source. Gas enters at the inlet 1577 and exits at outlet 1578. A first laser 1575 and a second laser 1576 directing radiation towards the reaction chamber along the axis of the reactor assembly is shown. RA coils 1571, 1572 and 1573 are shown. In this embodiment pencil lamps 1565, 1566, 1567, 1568, 1569, and 1570 are all shown horizontally disposed in pairs along the radius towards the reactor assembly central axis. Tips are proximal to RA coils 1571, 1572 and 1573. X-ray source 1574 directs x-rays towards the center axis of the reactor assembly. Support 15109 supports all of the horizontal pencil lamps. Other non-material spacers and connectors remain unlabeled.

Figure 7H:
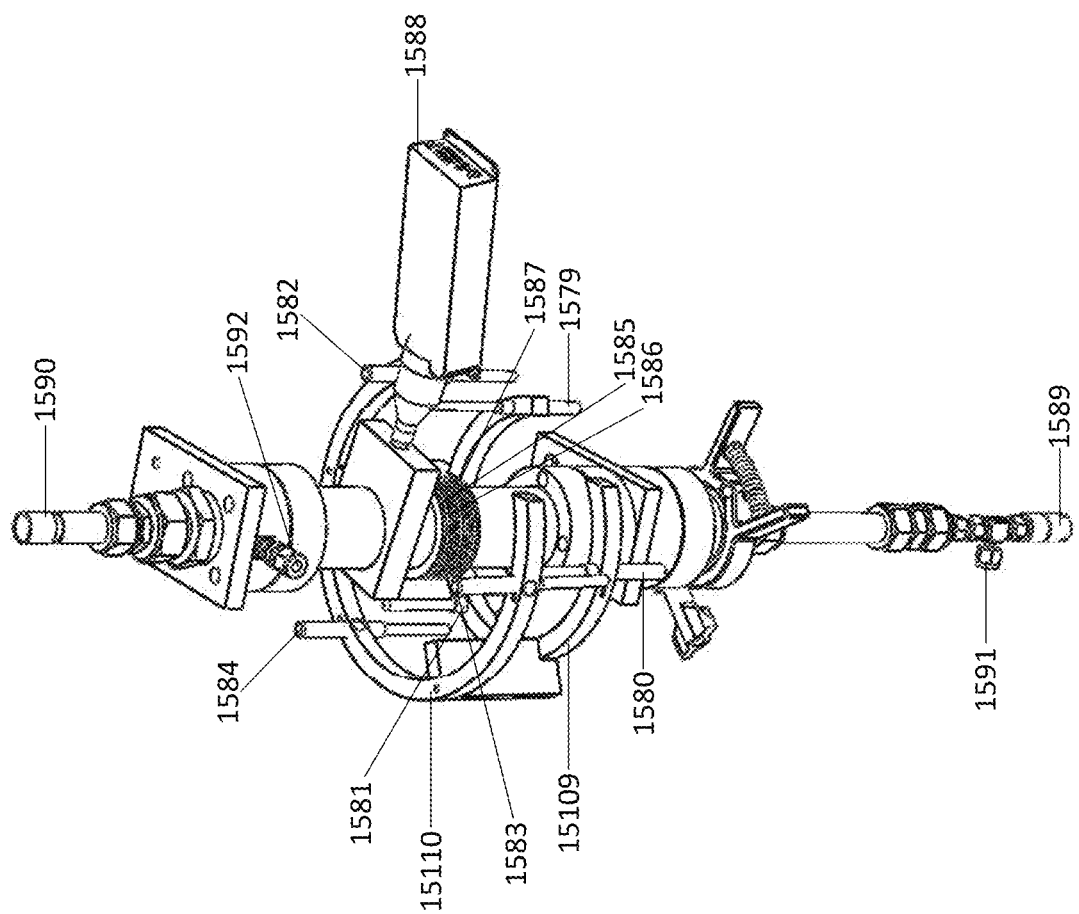

FIG. 7H is a perspective view of a reactor assembly with the pencil lamps and x-ray source. Gas enters at the inlet 1591 and exits at outlet 1592. A first laser 1589 and a second laser 1590 directing radiation towards the reaction chamber along the axis of the reactor assembly is shown. RA coils 1585, 1586 and 1587 are shown. In this embodiment pencil lamps 1579, 1580, 1581, 1582, 1583, and 1584 are all shown vertically disposed in pairs in radial planes aligned with the RA coils. Tips are proximal to RA coils 1585, 1586 and 1587. X-ray source 1588 directs x-rays towards the center axis of the reactor assembly. Supports 15109 and 15110 support the pencil lamps. Other non-material spacers and connectors remain unlabeled.

Figure 7I:
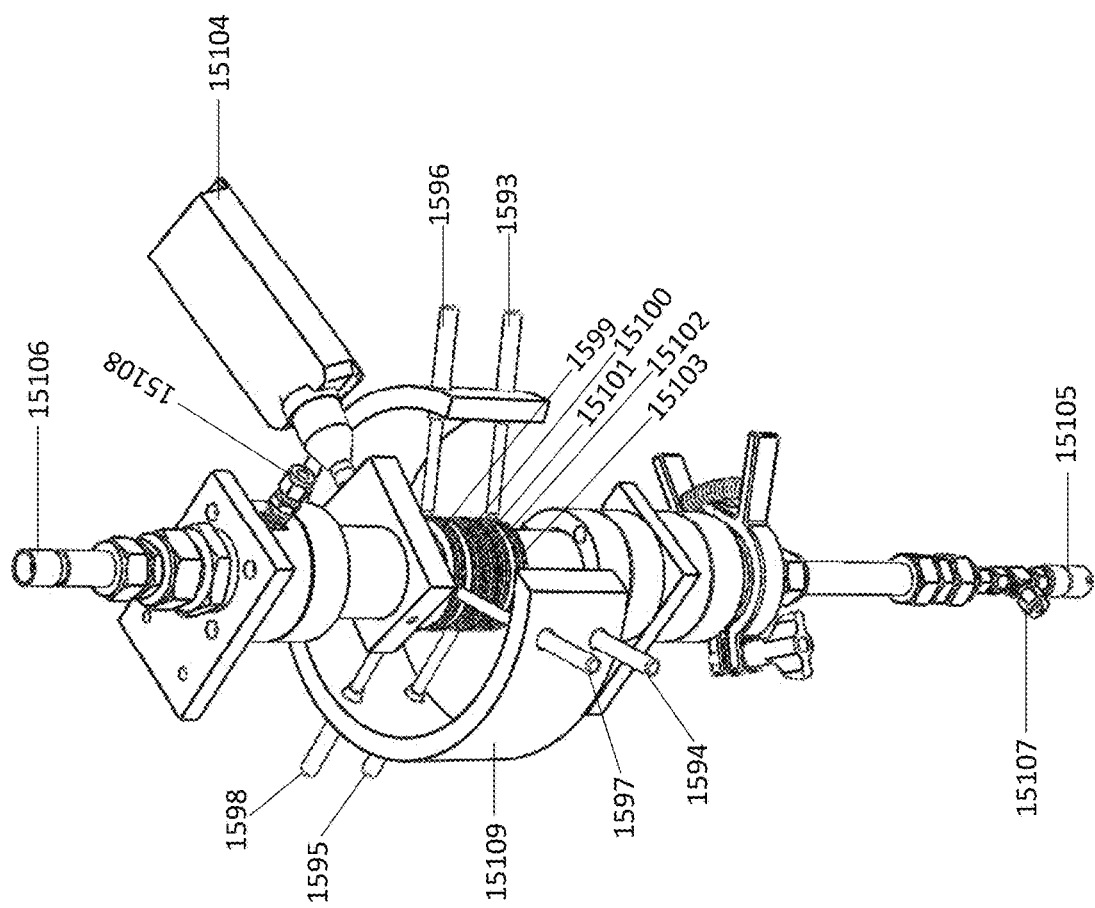

FIG. 7I is a perspective view of a reactor assembly illustrating 5 RA coils, horizontal pencil lamps and an x-ray source. Gas enters at the inlet 15107 and exits at outlet 15108. A first laser 15105 and a second laser 15106 directing radiation towards the reaction chamber along the axis of the reactor assembly is shown. RA coils 1599, 15100, 15101, 15102 and 15103, defining a cylindrical boundary, are shown. In this embodiment pencil lamps 1593, 1594, 1595, 1596, 1597, and 1598 are all shown horizontally disposed in pairs in radial planes aligned with the RA coils. Tips are proximal to RA coils 1599 and 15103. X-ray source 15104 directs x-rays towards the center axis of the reactor assembly. Support 15109 support the pencil lamps. Other non-material spacers and connectors remain unlabeled.

Figure 8C:
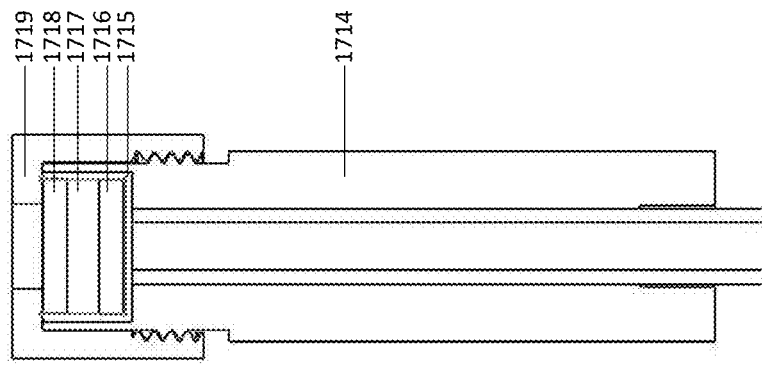
FIGS. 8A-8C are illustrations of reactor variations.
Figure 8B:
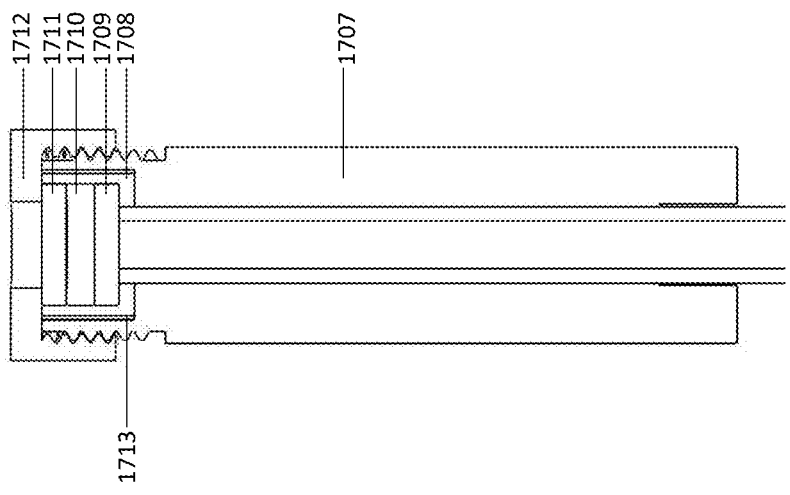
Figure 8A:
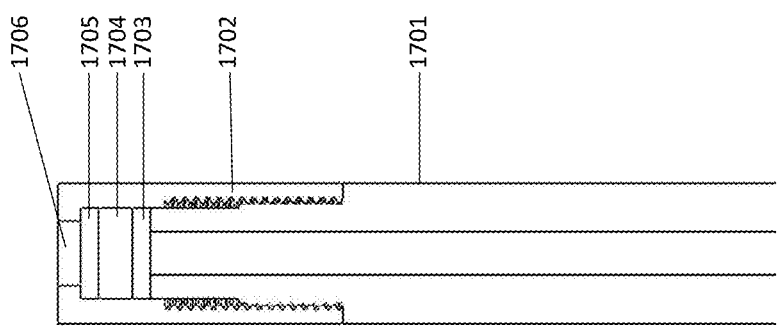

Ni-1 Reactor:

Referring to FIG. 8A, the reactor body (1702) is based on a high purity nickel (Ni) rod. The Ni rod, with an outside diameter of 15.873 mm (OD) is bored through then machined with a female thread on one end. The inside diameter allows for the installation of upper and lower frit and carbon bed. The carbon reaction medium is housed inside the reactor body (1702). To load the reactor, the reactor body (1702) is positioned with the gas discharge opening (1706) facing down on a flat surface. A quartz frit (1705) is placed inside the reactor body (1702) to form the upper containment. 100 mg of carbon is then loaded into the reactor body (1702). After loading of the graphite bed inside the reactor body (1702), a second quartz frit (1703) is installed. A reactor pole (1701), machined out of a high purity graphite rod with matched male threads for the reactor body (1702), is then screwed onto the reactor body (1702). The reactor pole (1701) is designed to provide the identical graphite bed compression as that provided by the cup design (1708).

NiPtG Reactor:

Referring to FIG. 8B, in the NiPtG Reactor embodiment, the reactor body (1707) is based on a high purity nickel (Ni) rod. The Ni rod, with an outside diameter of 15.873 mm (OD) is bored through then machined on one end to have an inside diameter of 11.68 mm (ID). The inside diameter allows for the installation of a graphite cup (1708) and an optional 0.025 mm platinum (Pt) foil (1713). The graphite cup provides for reactor wall and foil isolation from the carbon bed. The carbon reaction medium is housed inside a 99.9999 wt % pure graphite cup (1708). To load the reactor, a quartz frit (1709) is placed inside the graphite cup (1708) to form the bottom containment. 100 mg of carbon (1710) is then loaded into the cup (1708). After loading of the graphite bed inside the cup, a second quartz frit (1711) is installed; this system is defined as the cup assembly. Prior to installing the cup assembly, the foil (1713) is used to line the inside surface of the reactor wall. The cup assembly is then placed within the nickel reactor body (1707) and foil (1713). After the cup assembly is installed, a 99.9999 wt % pure graphite cap (1712) is screwed onto the reactor body. The cap secures the cup from movement after assembly. The figure additionally is illustrative of the GG Reactor configuration.

PtIrGG Reactor:

Referring to FIG. 8C, the reactor body (1714) is based on a high purity graphite rod. The graphite rod, with an outside diameter of 15.873 mm (OD) is bored through then machined on one end to have an inside diameter of 11.68 mm (ID). The inside diameter allows for the installation of a graphite cup (1715) for reactor wall isolation from the carbon bed. The carbon reaction medium is housed inside a 99.9999 wt % pure graphite cup (1715). To load the reactor, a quartz frit (1716) is placed inside the graphite cup to form the bottom containment. 100 mg of carbon (1717) is then packed into the cup. After loading of the graphite bed inside the cup, a second quartz frit (1718) is installed; this system is defined as the cup assembly. The cup assembly is then placed within the graphite reactor body (1714). After the cup assembly is installed, a cap (1719) composed of platinum and 10% wt iridium is screwed onto the reactor body. The cap secures the cup from movement after assembly.

The residence time of the starting material within the reactor is effective to instantiate product into the starting material and can be between 0 and 15 minutes.

Preferred reactors used in the methods of the invention are shown in the table below.

the boundaries of the system, by selecting the reactor materials and adding a foil layer can also enhance the harmonics.

In particular, the invention includes processes of producing, or instantiating, nanoporous carbon compositions comprising the steps of:

adding a nanoporous carbon powder into a reactor assembly as described herein;

adding a feed gas to the reactor assembly;

powering the one or more RA coils to a first electromagnetic energy level;

heating the nanoporous carbon powder;

harmonic patterning the nanoporous carbon powder between a first electromagnetic energy level and a second electromagnetic energy level for a time sufficient to instantiate hydrogen in a nanopore and, optionally, collecting the hydrogen.

The invention includes a process for producing a product gas comprising the steps of:

| Reactor ID | Cup Material | Cap Material | Reactor Material | Pole Material | Boundary | Chamber Capacity | Coil Type |
|---|---|---|---|---|---|---|---|
| CgF | N/A | N/A | Cu, Ni or Mo or graphite | graphite | N/A | 100 mg | Induction |
| CuG | Graphite | graphite | Cu | quartz | N/A | 100 mg | Induction or Frequency |
| PtIrGG | Graphite | Pt/Ir | graphite | quartz | N/A | 100 mg | Induction |
| GPtG | Graphite | graphite | graphite | quartz | Pt | 100 mg | Induction or Frequency |
| GPtGPtG | Graphite | graphite | graphite | quartz | 2X Pt | 100 mg | Induction |
| GG-EL | Graphite | graphite | graphite | quartz | N/A | 100 mg-3 g | Induction or Frequency |
| Foil (Pt) | Graphite | graphite | graphite | quartz | Pt | 100 mg | Induction or Frequency |
| GZ Foil | Graphite | graphite | graphite | quartz | Nb, Co or , any | 100 mg | Induction or Frequency |
| nZG Foil | Graphite | Any Z | graphite | quartz | Ir | 100 mg | Induction or Frequency |
| NiG | Graphite | graphite | Ni | quartz | N/A | 100 mg | Induction or Frequency |
| NiPtG | Graphite | graphite | Ni | quartz | Pt | 100 mg | Induction |
| ZG | N/A | Pd/Ru or any Z | graphite | quartz | N/A | 100 mg | Induction |
| Ref-X | Graphite | graphite | graphite | quartz | N/A | 1-20 g | Frequency |

The invention further relates to methods of instantiating materials in nanoporous carbon powders. It has been surprisingly found that light elements, such as hydrogen, oxygen, helium, and the like are instantiated. Instantiating is defined herein to include the nucleation and assembly of atoms within carbon structures, particularly, ultramicropores. Without being bound by theory, it is believed instantiation is related to, inter alia, degrees of freedom of the electromagnetic field as expressed by quantum field theory. By exposing a gas to harmonic resonances, or harmonics, of electromagnetic radiation within one or more ultramicropores, vacuum energy density is accessed and allows for the nucleation and assembly of atoms. Electromagnetic energy that is within the frequencies of light, x-rays, and magnetic fields subjected to frequency generators can enhance the formation and maintenance of such harmonics. Modifying (a) adding a feed gas to an electromagnetic embedding apparatus:

(b) exposing the feed gas to at least one E/MEE light source;

(c) directing the feed gas from step (b) to a reactor assembly comprising:

A gas inlet and one or more gas outlets;

A reactor chamber containing a nanoporous carbon disposed within a cup and, optionally, covered with a cap;

A first porous frit defining a floor of the reactor chamber disposed within the cup, A second porous frit defining the ceiling of the reactor chamber; wherein each porous frit has a porosity that is sufficient to allow a gas to permeate into the reactor chamber;

A reactor head space disposed above the reactor chamber;

At least one RA coil surrounding the reactor chamber and/or reactor head space operably connected to a power supply, wherein the computer processing unit is configured to control the power supply to the RA coil;

(d) subjecting the nanoporous carbon powder to harmonic patterning to instantiate hydrogen;

(f) collecting the product gas comprising the hydrogen; and (g) isolating the hydrogen from the product gas.

The term "harmonic patterning" is defined herein as oscillating between two or more energy levels (or states) a plurality of times. The energy states can be characterized as a first, or high, energy level and a second, or lower, energy level. The rates of initiating the first energy level, obtaining the second energy level and re-establishing the first energy level can be the same or different. Each rate can be defined in terms of time, such as over 1, 2, 3, 4, 5, 6, 7, 8, 9, 10 or more seconds. Each energy level can be held for a period of time, such as 1, 2, 3, 4, 5, 6, 7, 8, 9, 10 or more seconds. Harmonic patterning is continued until instantiation is achieved.

Where two more electromagnetic radiation sources are present (e.g., coils, x-ray source, lasers, and/or lamps), each can be subjected to harmonic patterning and the patterning can occur independently, simultaneously or sequentially.

The process further comprises independently powering any additional electromagnetic radiation source, as described above in the E/MEE apparatus or reactor assembly. For example, the process further comprises the step(s) of powering RA frequency generator(s) connected to one or more RA coils, one or more lamps or lasers, x-ray sources, induction coils, E/MEE coils, and the like substantially as described above.

The invention particularly relates to the identification and collection of a product gas produced by the methods. The product gas can be collected from the process in a continuous, semi-continuous or batch manner. The product gas typically comprises the feed gas (or first gas composition, as discussed above) and a second gas composition, comprising hydrogen. The second gas composition is distinct from the first gas composition and preferably contains one or more gases not present in the feed gas. For example, where the feed gas is pure nitrogen (e.g., a gas comprising at least 99% vol nitrogen, such as at least 99.9% vol nitrogen), such as a nitrogen gas with less than 1% hydrogen, the product gas will contain one or more other materials (e.g., elements or molecules that exist in gas form under ambient conditions), preferably hydrogen. The feed gas can also include air. The product gas comprises hydrogen and an additional gas such as helium, water, neon, nitrogen, carbon monoxide, oxygen, argon, carbon dioxide, fluorocarbons, ammonia, krypton, xenon, methane and other hydrocarbons or organics and mixtures thereof. "Product gas" is defined herein as being compositionally distinct different from the term "Feed gas" and explicitly excludes air.

Preferred product gases comprise at least about 1% vol (preferably at least about 4% vol) hydrogen. Preferably, product gases will further comprise neon, helium, argon and combinations thereof. Typically, the product gas will further comprise the components found in the feed gas (e.g., nitrogen or air), however, in concentrations distinct therefrom. A preferred product gas comprises nitrogen, hydrogen and a gas selected from neon, helium, argon and combinations thereof. A preferred product gas comprises nitrogen, hydrogen, oxygen and a gas selected from neon, helium, argon and combinations thereof. A preferred product gas comprises at least 1% vol helium, argon, neon and combinations.

The invention permits the manufacture of green gas, such as product gas that has less than 0.5% vol $CO_2$, such as less than 100 ppm $CO_2$.

The hydrogen can be isolated from, or purified, the product gas, thereby producing a high concentration hydrogen gas. An example of a purification system utilizing a hydrogen-selective membrane. Examples of suitable materials for membranes include palladium and palladium alloys, and especially thin films of such metals and metal alloys. Palladium alloys are particularly effective, especially palladium with 35 weight % to 45 weight % copper. Another effective alloy is palladium with 2 weight % to 10 weight % gold, such as palladium with 5 weight % gold. Hydrogen-selective membranes can be configured to be a foil. Alternatively or additionally a pressure swing adsorption system can be used to concentrate hydrogen and remove unwanted gases. Such processes use activated carbon, silica or zeolites.

Ex. 1: Energy/Light Combed Activation (E/LC)

One hundred milligrams (100 mg) of powdered carbon was placed in a GG-EL graphite tubular reactor (15.875 mm) OD, with ID machined to ~9 mm). This reactor was inserted into a reactor assembly FIG. 2A and then placed into a high vacuum oven for degassing according to the Degassing Procedure (See Profile 1 or Profile 2). After degassing, the reactor assembly is transferred to a test cell for processing. Research-grade Nitrogen (N2) was delivered at 2 SLPM to purge the system for a minimum of 25 seconds or more. The gases were fed through the E/MEE in a horizontal and level gas line, as described above. During purging, gas sampling lines are also purged. TEDLAR® sealed bags, when used, are connected to the sampling lines during the purge cycle.

Referring to FIG. 1, the argon "KC" light 108 located in position 0 (vertical lamp orientation; 7.62 cm from inlet or entrance flange; at 180°; bulb tip pointing up 2.54 cm from the outer diameter of the gas line) was turned on at the onset while simultaneously energizing the power supply to 5 amps. This light was kept on for a minimum hold time of 9 sec. Next light 109 in position 1 (109; horizontal lamp orientation; 7.62 cm from inlet or entrance flange; at 180°; bulb tip facing exit plate; bulb glass base at the optical entrance; 5.08 cm, from the outer diameter of the gas line), a krypton light, was turned on and the power is increased to 10 amps on the power supply. This was held for 3 seconds, light 107, in position 1 (107; horizontal lamp orientation; at 0°; bulb tip at the optical exit facing the exit plate; 5.04 cm from the outer diameter of the gas line), a xenon light was turned on and held for 9 seconds and the power was increased to 15 amps. After these 3 lights have been sequentially turned on, the sealed TEDLAR® bags are opened for gas collection, and the amperage delivered to reactor was adjusted to 100 amps and held for a minimum of 30 seconds. Immediately after the power was increased light 103 in position 1 (103; vertical lamp orientation; 7.62 cm from inlet or entrance flange; at 0°; bulb tip pointing down 2.54 cm from the outer diameter of the gas line), a neon light, was turned on.

Amperage harmonic patterning was then initiated on the reactor. With each amperage pattern (oscillation), the gases fed to the reactor can treated by the same or different light sequence. In one embodiment of the experimental protocol, the amperage of the reactor was increased to 78.5 amps over 1 second, the high-end harmonic pattern point. The amperage of the reactor was then decreased to 38.5 amps over 9 seconds and held at 38.5 amps for 3 seconds. Immediately at the start of the 3 second hold, an argon light 122 in position 1 (122; horizontal lamp orientation; at 180°; bulb tip pointing towards entrance plate at the optical entrance; 5.04 cm from the outer diameter of the gas line) was turned on. After the 3 second hold, amperage to the reactor was then ramped up to 78.5 amps over 9 seconds with a 3 second hold upon reaching 78.5 amps before a downward ramp was initiated. The reactor amperage was decreased to 38.5 amps, over 9 seconds and then held for 3 seconds. Immediately at the start of the 3 second hold, light 103 (103), a neon light in position 1, was turned on. The reactor amperage was again ramped up to 78.5 amps over 9 seconds, held there for 3 seconds, and then again ramped down to 38.5 amps over 9 seconds. A long-wave ultraviolet lamp (104; horizontal lamp orientation; at 90°; bulb tip facing entrance plate at the optical entrance; 5.04 cm from the outer diameter of the gas line) in position 1 was turned on.

The reactor was again ramped up to 78.5 amps over 9 seconds, held for 3 seconds, then decreased to 38.5 amps over another 9 seconds. Next a short-wave ultraviolet lamp (105 horizontal lamp orientation; 7.62 cm from inlet or entrance flange; at 270°; bulb tip at the optical entrance and facing the entrance plate; 5.04 cm from the outer diameter of the gas line) in the E/MEE (position 1) E/MEE section light was turned on and held for 3 seconds. The reactor was again ramped up to 78.5 amps over 9 seconds and held for 3 seconds. After the 3 second hold, the reactor amperage was decreased to 38.5 amps over another 9 seconds. The reactor was then held at 38.5 amps for 3 seconds, before another ramp up to 78.5 amps over 9 seconds was initiated. At 3 seconds into this ramp, lamp 107, in position 1 (107) was turned on and held there for the remaining 6 seconds of the 9 second total ramp. The reactor was held for 3 seconds in this condition.

The lights were turned off simultaneously in the E/MEE section as follows: (103), (108), (106), (105) and (104) and the reactor was deenergized. The reactor was held at this state, with continuous gas flow for 27 seconds during which the TEDLAR® bags are closed and removed. All remaining lights were turned off and gas flow continues for 240 seconds.

Example 2: Degassing Profile 1

One hundred milligrams (100 mg) of powdered carbon was placed in a graphite tubular reactor (15.875 mm) OD, with ID machined to ~9 mm), as described above and loaded into a closed end system. After ten closed end set-ups have been completed, each individual unit was loaded into the degassing oven openings and all incoming and outgoing lines were connected to the closed end systems. Isolated each incoming line to each reactor while maintaining the outgoing lines in an open position. Started the vacuum system until the vacuum gauge reads at least 750 mmHg. Upon reaching 750 MmHg, closed all outgoing line valves from the closed end systems and secured the vacuum pump. Performed a 30-minute leak test of the system. After successfully passing the leak check, opened each incoming line to the closed end system one at a time at 0.4 slpm $N_2$. Once all incoming lines were open and the vacuum gauge reached a slight positive pressure, opened the outgoing gas line on the degassing oven. Started the degassing oven profile ramping from $T_{amb}$ to 400° C. over 1 hour while maintaining $N_2$ flow. After the 1-hour ramp, maintained flow for an additional hour for temperature stabilization while maintaining gas flow. After the temperature stabilization was complete, secured all incoming gas flows and isolated the degassing oven vent line. Immediately started the vacuum pump and begin the degassing protocol. Maintained the temperature and vacuum for 12 hours. After the 12 hours, allowed the oven to cool prior to closed end unit removal.

Example 3: Degassing Profile 2

One hundred milligrams (100 mg) of powdered carbon was placed in a graphite tubular reactor (15.875 mm) OD, with ID machined to ~9 mm), as described above and loaded into a closed end system. After ten closed end set-ups have been completed, each individual unit was loaded into the degassing oven openings and connected all incoming and outgoing lines to the closed end systems. Isolated each incoming line to each reactor while maintaining the outgoing lines in an open position. Started the vacuum system until the vacuum gauge reads at least 750 mmHg. Upon reaching 750 MmHg, closed all outgoing line valves from the closed end systems and secured the vacuum pump. Performed a 30-minute leak test of the system. After successfully passing the leak check, opened each incoming line to the closed end system one at a time at 0.4 SLPM $N_2$. Once all incoming lines were open and the vacuum gauge reached a slight positive pressure, opened the gas outgoing gas line on the degassing oven. Started the degassing oven profile ramping from 200° C.±50° C. to 400° C. over 1 hour while maintaining $N_2$ flow. After the 1-hour ramp, maintained flow for an additional hour for temperature stabilization while maintaining gas flow. After the temperature stabilization was complete, secured all incoming gas flows and isolated the degassing oven vent line. Immediately started the vacuum pump and began the degassing protocol. Maintained the temperature and vacuum for 12 hours. After the 12 hours, allowed the oven to cool prior to closed end unit removal.

Example 4: Gas Analysis

For the chemical analysis of gas samples in TEDLAR® bags, a test protocol was developed based on the standard test method established for internal gas analysis of hermetically-sealed devices. Prior to sample measurement, system background was determined by following exact measurement protocol that is used for sample gas. For system background and sample, a fixed volume of gas was introduced to the Pfeiffer QMA 200M quadrupole mass spectrometer (QMS) system through a capillary. Through a capillary, a fixed volume of gas was introduced to the Pfeiffer QMA 200M quadrupole mass spectrometer (QMS) system. After sample gas introduction, the ion current for specific masses (same as masses analyzed for system background) were measured. During background and sample gas analyses total pressure of the QMS system was also recorded, allowing for correction of the measured ion current.

TABLE 1

Gases analyzed for the test method and measured masses used in deconvolution.

| Gas | Masses used for deconvolution |
| --- | --- |
| 1. Hydrogen | 2, 18, 55, 57 |
| 2. Helium (3) | 2, 4 |
| 3. Helium (4) | 4 |
| 4. Methane | 14, 15 |
| 5. Water | 18, 32, 40 |
| 6. Neon (20) | 18, 20, 40 |
| 7. Neon (22) | 20 |
| 8. Nitrogen | 14 |

TABLE 1-continued

Gases analyzed for the test method and measured masses used in deconvolution.

| Gas | Masses used for deconvolution |
|---|---|
| 9. Carbon Monoxide | 14, 28 |
| 10. Oxygen | 32 |
| 11. Argon | 40, 41, 43 |
| 12. Carbon Dioxide | 44 |
| 13. Tot. HC and Org. | 55, 57 |
| 14. Fluorocarbons | 69 |
| 15. Ammonia | 17, 18 |
| 16. Krypton | 84 |
| 17. Xenon | 132 |

Data Analysis:

Measurements of the ion current for each mass were corrected to the average of measured background contributions corrected for pressure difference. Subsequent to the background correction, individual corrected mass signals were averaged and corrected to a known gas standard to determine the percent volume of 17 gas species. All corrections were determined using nitrogen and nitrogen-hydrogen mixture reference gases analyzed to match selected process gas for test samples using the developed protocol based on the standard test method, in accordance with Military Standard (MIL-STD-883) Test Method 1018, Microcircuits, Revision L, FSC/Area: 5962 (DLA, 16 Sep. 2019). Results below: 1%=10,000 ppm, Volume values for gas blanks and samples were produced using the developed gas analysis test method and validated using a gas mixture standard of 99.98% nitrogen and 0.02% hydrogen. All analytical performed by EAG Laboratories, Liverpool, N.Y. using standard TEDLAR® bag gas sampling protocols and specified mass spectrometry methods.

Mass Analyzer: Quadrupole mass spectrometer (Pfeiffer QMA 200M)
Measurement mode: Analog scan for selected masses
No. of channels used: 64
Mass resolution: Unit resolution
Maximum detectable concentration: 100%
Minimum detectable concentration: 1 ppb
Background vacuum: $<2\times10^{-6}$ Torr
Results:

| Protocol 1: | | | |
|---|---|---|---|
| Gases Analyzed (Vol %) | Ill. 1 | Ill. 2 | Ill. 3 |
| Hydrogen | 0.7678 | 0.2405 | 0 |
| Helium (4) | 0.1923 | 0.2963 | 0.1928 |
| Methane ($CH_4$) | 0 | 0 | 0 |
| Water ($H_2O$) | 0.4054 | 1.0773 | 0 |
| Neon (20) | 0.036 | 0.03 | 0.0417 |
| Neon (22) | 0.0036 | 0.003 | 0.0042 |
| Nitrogen | 95.276 | 89.3705 | 99.347 |
| Carbon Monoxide (CO) | 0 | 0 | 0 |
| Oxygen | 3.1604 | 8.5606 | 0.3796 |
| Argon | 0.0676 | 0.349 | 0.0003 |
| Carbon Dioxide ($CO_2$) | 0.0138 | 0 | 0 |
| Total Hydrocarbons and Organics | 0.0269 | 0 | 0.0175 |
| Fluorocarbons | 0.0261 | 0.0417 | 0.0162 |
| Ammonia ($NH_3$) | 0 | 0.031 | 0 |
| Krypton | 0.0242 | 0 | 0 |
| Xenon | 0 | 0 | 0 |

| Gases Analyzed (Vol %) | Ill. 4 | Ill. 5 | Ill. 6 |
|---|---|---|---|
| Hydrogen | 0 | 0.0162 | 1.027 |
| Helium (4) | 0.5476 | 0.1254 | 0.364 |
| Methane ($CH_4$) | 0 | 0 | 0 |
| Water ($H_2O$) | 0 | 0 | 0 |
| Neon (20) | 0.1789 | 0.0345 | 0.1093 |
| Neon (22) | 0.0179 | 0.0035 | 0.0109 |
| Nitrogen | 88.2306 | 99.6251 | 97.1911 |
| Carbon Monoxide (CO) | 0 | 0 | 0 |
| Oxygen | 10.945 | 0.1826 | 1.2975 |
| Argon | 0.08 | 0 | 0 |
| Carbon Dioxide ($CO_2$) | 0 | 0 | 0 |
| Total Hydrocarbons and Organics | 0 | 0 | 0 |
| Fluorocarbons | 0 | 0.0127 | 0 |
| Ammonia ($NH_3$) | 0 | 0 | 0 |
| Krypton | 0 | 0 | 0 |
| Xenon | 0 | 0 | 0 |

| Gases Analyzed (Vol %) | Ill 7. | Ill. 8 | Ill. 9 |
|---|---|---|---|
| Hydrogen | 0 | 0 | 4.0494 |
| Helium (4) | 2.6033 | 0.2145 | 25.118 |
| Methane ($CH_4$) | 0 | 0 | 0 |
| Water ($H_2O$) | 0 | 0 | 0 |
| Neon (20) | 0.4736 | 0.0308 | 5.6369 |
| Neon (22) | 0.0474 | 0.0031 | 0.5637 |
| Nitrogen | 94.6204 | 95.9834 | 56.538 |
| Carbon Monoxide (CO) | 0 | 0 | 0 |
| Oxygen | 2.2553 | 3.7604 | 4.1726 |
| Argon | 0 | 0.0078 | 0 |
| Carbon Dioxide ($CO_2$) | 0 | 0 | 0 |
| Total Hydrocarbons and Organics | 0 | 0 | 1.0654 |
| Fluorocarbons | 0 | 0 | 1.9565 |
| Ammonia ($NH_3$) | 0 | 0 | 0 |
| Krypton | 0 | 0 | 0.8997 |
| Xenon | 0 | 0 | 0 |

| Protocol 2: | | | | | | |
|---|---|---|---|---|---|---|
| Gases Analyzed (Vol. %) | Ill. 10 | Ill. 11 | Ill. 12 | Ill. 13 | Ill. 14 | Ill. 15 |
| Hydrogen | 0 | 1.0428 | 1.3437 | 0 | 1.6249 | 1.7941 |
| Helium (4) | 0.4679 | 0.3492 | 0.4409 | 0.8074 | 0.4888 | 0.6406 |
| Methane ($CH_4$) | 0 | 0 | 0 | 0 | 0 | 0 |
| Water ($H_2O$) | 0 | 2.3924 | 3.1436 | 0 | 4.4032 | 2.4182 |
| Neon (20) | 0.1598 | 0 | 0 | 0 | 0 | 0 |
| Neon (22) | 0.016 | 0 | 0 | 0 | 0 | 0 |
| Nitrogen | 76.7986 | 79.9798 | 94.2126 | 51.1046 | 92.2167 | 75.6209 |
| Carbon Monoxide (CO) | 0 | 0 | 0 | 0 | 0 | 0 |
| Oxygen | 22.079 | 15.565 | 0.8348 | 48.088 | 1.239 | 18.7733 |
| Argon | 0.4639 | 0.5717 | 0 | 0 | 0 | 0.721 |

-continued

Protocol 2:

| Gases Analyzed (Vol. %) | Ill. 10 | Ill. 11 | Ill. 12 | Ill. 13 | Ill. 14 | Ill. 15 |
|---|---|---|---|---|---|---|
| Carbon Dioxide ($CO_2$) | 0 | 0.0991 | 0.0244 | 0 | 0.0274 | 0.0319 |
| Total Hydrocarbons and Organics | 0 | 0 | 0 | 0 | 0 | 0 |
| Fluorocarbons | 0.0147 | 0 | 0 | 0 | 0 | 0 |
| Ammonia ($NH_3$) | 0 | 0 | 0 | 0 | 0 | 0 |
| Krypton | 0 | 0 | 0 | 0 | 0 | 0 |
| Xenon | 0 | 0 | 0 | 0 | 0 | 0 |

Standard (Nitrogen):

| Gases Analyzed | Vol % Standard 99.98 vol % $N_2$/ 200 ppm $H_2$ |
|---|---|
| Hydrogen | 0.0223 |
| Helium (3) | 0.0000 |
| Helium (4) | 0.0000 |
| Methane ($CH_4$) | 0.0000 |
| Water ($H_2O$) | 0.0000 |
| Neon (20) | 0.0000 |
| Neon (22) | 0.0000 |
| Nitrogen | 99.9777 |
| Carbon Monoxide (CO) | 0.0000 |
| Oxygen | 0.0000 |
| Argon | 0.0000 |
| Carbon Dioxide ($CO_2$) | 0.0000 |
| Total Hydrocarbons and Organics | 0.0000 |
| Fluorocarbons | 0.0000 |
| Ammonia ($NH_3$) | 0.0000 |
| Krypton | 0.0000 |
| Xenon | 0.0000 |

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. Numerical values where presented in the specification and claims are understood to be approximate values (e.g., approximately or about) as would be determined by the person of ordinary skill in the art in the context of the value. For example, a stated value can be understood to mean within 10% of the stated value, unless the person of ordinary skill in the art would understand otherwise, such as a value that must be an integer.

What is claimed is:

1. A process for producing hydrogen comprising the steps of:
   (a) adding a feed gas to an electromagnetic embedding enclosure (E/MEE);
   (b) exposing the feed gas to at least one E/MEE light source;
   (c) directing the feed gas from step (b) to a reactor assembly comprising:
      a gas inlet and one or more gas outlets;
      a reactor chamber containing a nanoporous carbon disposed within a cup and, optionally, covered with a cap;
      a first porous frit defining a floor of the reactor chamber disposed within the cup,
      a second porous frit defining the ceiling of the reactor chamber; wherein each porous frit has a porosity that is sufficient to allow a gas to permeate into the reactor chamber;
      a reactor head space disposed above the reactor chamber;
      at least one reactor assembly (RA) coil surrounding the reactor chamber and/or reactor head space operably connected to a power supply, wherein a computer processing unit is configured to control the power supply to the RA coil;
   (d) subjecting the nanoporous carbon to harmonic patterning to instantiate hydrogen;
   (f) collecting a product gas comprising the hydrogen; and
   (g) isolating the hydrogen from the product gas.

2. The process of claim 1, wherein the cup is composed of graphite.

3. The process of claim 1, wherein the cap is composed of graphite, platinum, palladium or ruthenium.

4. The process of claim 1, further comprising a pole disposed below the reactor chamber and above the gas inlet.

5. The process of claim 4, wherein the pole is composed of quartz.

6. The process of claim 1, wherein: the feed gas comprises nitrogen.

7. The process of claim 1, wherein the nanoporous carbon comprises graphene having at least 95% wt. carbon (metals basis) having a mass mean diameter between 1 μm and 5 mm, and an ultramicropore surface area between about 100 and 3000 $m^2/g$.

8. The process of claim 1, wherein the nanoporous carbon has been degassed.

9. The process of claim 1, wherein the RA coil is an induction coil.

10. The process of claim 1, wherein the electromagnetic embedding enclosure (E/MEE) comprises at least 5 E/MEE pencil lamps located along a gas line containing the feed gas;
   wherein each E/MEE pencil lamp is independently placed such that its longitudinal axis is (i) parallel to an internal gas line, (ii) disposed radially in a vertical plane to the internal gas line, or (iii) perpendicular to the plane created along the longitudinal axis of the internal gas line or along the vertical axis of the internal gas line; and wherein each E/MEE pencil lamp is independently affixed to one or more pivots that permit rotation between about 0 and 360 degrees with respect to the x, y, and/or z axis wherein (i) the x-axis is defined as the axis parallel to the gas line and its vertical plane, (ii) the y-axis defining the axis perpendicular to the gas line and parallel to its horizontal plane, and (iii) the z-axis is defined as the axis perpendicular to the gas line and parallel to its vertical plane.

11. The process of claim 1, wherein the feed gas comprises at least 99% nitrogen.

12. The process of claim 1, wherein the feed gas comprises at least about 99.9% nitrogen.

13. The process of claim 12, wherein the product gas comprises at least about 1% vol. hydrogen.

14. The process of claim 13, wherein the product gas further comprises helium, argon, neon and combinations thereof.

15. The process of claim 13, wherein the helium, argon, neon and combinations thereof comprise at least 1% vol. of the product gas.

16. The process of claim 13, wherein the product gas contains less than about 0.5 vol % $CO_2$, such as less than 100 ppm $CO_2$.

17. A product gas produced by a process of claim 1.

18. A product gas of claim 17, comprising at least 1% vol. hydrogen, nitrogen, and one or more gases selected from the group consisting of helium, argon, and neon.

19. The product gas of claim 17, comprising at least 4% vol. hydrogen, nitrogen, and one or more gases selected from the group consisting of helium, argon, and neon.

20. The product gas of claim 19, wherein the product gas contains less than about 0.5 vol % $CO_2$, such as less than 100 ppm $CO_2$.

21. A process for producing hydrogen comprising the steps of:
(a) adding a feed gas to an electromagnetic embedding enclosure (E/MEE) comprising:
a gas line containing the feed gas; at least one E/MEE pencil lamp positioned below the gas line, at least one E/MEE pencil lamp positioned above the gas line and at least one E/MEE pencil lamp positioned to the side of the gas line;
wherein each E/MEE pencil lamp is independently rotatably mounted, located along the length of the gas line;
a power supply operably connected to each E/MEE pencil lamp;
a computer processing unit configured to independently control powering each E/MEE pencil lamp and a rotation position of each E/MEE pencil lamp;
(b) powering each E/MEE pencil lamp, thereby subjecting the feed gas to electromagnetic radiation; optionally rotating each E/MEE pencil lamp;
(c) directing the feed gas from step (b) to a reactor assembly comprising:
a gas inlet and one or more gas outlets;
a reactor chamber containing a nanoporous carbon disposed within a cup and, optionally, covered with a cap;
a first porous frit defining a floor of the reactor chamber disposed within the cup,
a second porous frit defining the ceiling of the reactor chamber and disposed below the cap; wherein each porous frit has a porosity that is sufficient to allow a gas to permeate into the reactor chamber and contain a nanoporous carbon;
a reactor head space disposed above the reactor cap;
at least one reactor assembly (RA) coil surrounding the reactor chamber and/or reactor head space operably connected to the power supply, wherein the computer processing unit is configured to control the power supply to the RA coil;
(d) powering each RA coil to a first electromagnetic energy level;
(e) subjecting the nanoporous carbon to harmonic patterning to instantiate hydrogen; and
(f) collecting a product gas comprising hydrogen.

* * * * *